(12) United States Patent
Abdelkhalik et al.

(10) Patent No.: US 10,197,040 B2
(45) Date of Patent: Feb. 5, 2019

(54) OPTIMAL CONTROL OF WAVE ENERGY CONVERTERS

(71) Applicants: National Technology & Engineering Solutions of Sandia, LLC, Albuquerque, NM (US); Michigan Technological University, Houghton, MI (US); South Dakota Board of Regents, Pierre, SD (US)

(72) Inventors: Ossama Abdelkhalik, Houghton, MI (US); Rush D. Robinett, III, Tijeras, NM (US); Shangyan Zou, Houghton, MI (US); Giorgio Bacelli, Albuquerque, NM (US); David G. Wilson, Tijeras, NM (US); Umesh Korde, Hancock, MI (US)

(73) Assignees: National Technology & Engineering Solutions of Sandia, LLC, Albuquerque, NM (US); Michigan Technological University, Houghton, MI (US); South Dakota Board of Regents, Pierre, SD (US)

( * ) Notice: Subject to any disclaimer, the term of this patent is extended or adjusted under 35 U.S.C. 154(b) by 35 days.

(21) Appl. No.: 15/466,605

(22) Filed: Mar. 22, 2017

(65) Prior Publication Data
US 2017/0298899 A1 Oct. 19, 2017

Related U.S. Application Data

(60) Provisional application No. 62/322,712, filed on Apr. 14, 2016.

(51) Int. Cl.
*F03B 13/16* (2006.01)
*G05B 19/406* (2006.01)
*F03B 15/00* (2006.01)

(52) U.S. Cl.
CPC .............. *F03B 15/00* (2013.01); *F03B 13/16* (2013.01); *G05B 19/406* (2013.01);
(Continued)

(58) Field of Classification Search
CPC .... F03B 13/16; F03B 15/00; F05B 2220/706; F05B 2260/84; F05B 2270/20; G05B 19/406; G05B 2219/39218; Y02E 10/38
See application file for complete search history.

(56) References Cited

U.S. PATENT DOCUMENTS 9,140,231 B1 * 9/2015 Wilson .................... F03B 15/00

OTHER PUBLICATIONS

Abraham et al. "Optimal Active Control and Optimization of a Wave Energy Converter" from "IEEE Transactions on Sustainable Energy, vol. 4, No. 2, Apr. 2013".*
Zandvliet et al. "Bang-bang control and singular arcs in reservoir flooding" from "Journal of Petroleum Science and Engineering 58 (2007) 186-200" (Year: 2007).*
Abdelkhalik, O. et al., "Estimation of excitation forces for wave energy converters control using pressure measurements", International Journal of Control, 2016, http://dx.doi.org/10.1080/00207179.2016.1222555, 14 pages.
(Continued)

*Primary Examiner* — Yuhui R Pan
(74) *Attorney, Agent, or Firm* — Kevin W. Bieg

(57) ABSTRACT

A wave energy converter and method for extracting energy from water waves maximizes the energy extraction per cycle by estimating an excitation force of heave wave motion on the buoy, computing a control force from the estimated excitation force using a dynamic model, and applying the computed control force to the buoy to extract energy from the heave wave motion. Analysis and numerical simulations demonstrate that the optimal control of a heave wave energy converter is, in general, in the form of a bang-singular-bang control; in which the optimal control at a given time can be
(Continued)

either in the singular arc mode or in the bang-bang mode. The excitation force and its derivatives at the current time can be obtained through an estimator, for example, using measurements of pressures on the surface of the buoy in addition to measurements of the buoy position. A main advantage of this approximation method is the ease of obtaining accurate measurements for pressure on the buoy surface and for buoy position, compared to wave elevation measurements.

12 Claims, 29 Drawing Sheets

(52) U.S. Cl.
CPC ..... *F05B 2220/706* (2013.01); *F05B 2260/84* (2013.01); *F05B 2270/20* (2013.01); *G05B 2219/39218* (2013.01); *Y02E 10/38* (2013.01)

(56) References Cited

OTHER PUBLICATIONS

Falnes, J., "A review of wave-energy extraction", Marine Structures 20 (2007), pp. 185-201.
Fusco, F. et al., "Hierarchical Robust Control of Oscillating Wave Energy Converters With Uncertain Dynamics", IEEE Transactions on Sustainable Energy, vol. 5, No. 3, Jul. 2014 , pp. 958-966.
Kasturi, P.D.P., "Constrained Optimal Control of Vibration Dampers", Journal of Sound and Vibration (1998), vol. 215(3), Art. No. sv981661, pp. 499-509.
Li, G. et al., "Wave energy converter control by wave prediction and dynamic programming", Renewable Energy 48 (2012) pp. 392-403.
Zou, S. et al., "Optimal control of wave energy converters", Renewable Energy 103 (2017), pp. 217-225.

* cited by examiner

OPTIMAL CONTROL OF WAVE ENERGY CONVERTERS

CROSS-REFERENCE TO RELATED APPLICATION

This application claims the benefit of U.S. Provisional Application No. 62/322,712, filed Apr. 14, 2016, which is incorporated herein by reference.

STATEMENT OF GOVERNMENT INTEREST

This invention was made with Government support under contract no. DE AC04-94AL85000 awarded by the U.S. Department of Energy to Sandia Corporation. The Government has certain rights in the invention.

FIELD OF THE INVENTION

The present invention relates to wave energy converters and, in particular, to a method for optimal control of wave energy converters.

BACKGROUND OF THE INVENTION

Waves can provide a reliable source of renewable energy compared to the solar and wind sources. There is a wide variety of wave energy extraction concepts depending on the mechanism of absorbing energy from the waves, the water depth, and the location (shoreline, near-shore, offshore). The energy extraction concepts can be categorized in three classes: oscillating water column devices, oscillating body systems, and overtopping converters. See A. F. de O. Falcao, Renew. Sustain. Energy Rev. 14(3), 899 (2010); M.-F. Hsieh et al., *IEEE Trans. Sustain. Energy* 3(3), 482, (2012); and A. Sproul and N. Weise, *IEEE Trans. Sustain. Energy* 6(4), 1183 (2015). The class of oscillating body systems includes single-body heaving buoys, two-body heaving systems, fully submerged heaving systems, and pitching devices. FIG. 1 is a widely used illustration of a typical heaving buoy (point absorber).

In point absorbers, the energy extraction results from the oscillating movement of a single body reacting against a fixed frame of reference (the sea bottom or a bottom-fixed structure). In one typical configuration of these Wave Energy Converters (WECs), hydraulic cylinders are attached to the floating body. When the float moves due to heave the hydraulic cylinders drive hydraulic motors which in turn drive a generator. See J. Falnes, *Marine Struct.* 20(4), 185 (2007). This type of WEC extracts the wave heave energy. There are other types of WECs that extract surge energy. See E. Renzi and F. Dias, *Eur. J. Mech. B Fluids* 41(0), 1 (2013). The mechanisms that translate the motion of oscillating bodies in water to useful electrical energy are usually called Power Take-Off (PTO) systems. See F. Fusco, *Real-time Forecasting and Control for Oscillating Wave Energy Devices*, Ph.D. thesis, NUI MAYNOOTH, Faculty of Science and Engineering, Electronic Engineering Department, July 2012.

SUMMARY OF THE INVENTION

The present invention is directed to a wave energy converter and method for extracting energy from water waves. The method comprises providing a wave energy converter comprising a buoy in water having heave wave motion; estimating an excitation force of the heave wave motion on the buoy; computing a control force from the estimated excitation force using a dynamic model, wherein the model comprises constructing a Hamiltonian as a function of buoy states, computing partial derivatives of the Hamiltonian with respect to the buoy states and the control force, and computing the control force at which the partial derivatives vanish; and applying the computed control force to the buoy to extract energy from the heave wave motion. The Hamiltonian can be a linear function of the control force, whereby the control force comprises a singular arc. The buoy states can comprise a heave position and a heave velocity of the buoy, and can further comprise a radiation state. For example, the excitation force can be estimated from a wave elevation in front of the buoy or, more preferably, from pressure measurements on a surface of the buoy and a heave position of the buoy. For example, the buoy can be a spherical or cylindrical buoy, although other buoy shapes can also be used.

The goal of the method is to maximize the energy extraction per cycle. Both constrained and unconstrained optimal control problems are described as examples of the invention. Both periodic and non-periodic excitation forces are considered. Analysis and numerical simulations demonstrate that the optimal control of a heave wave energy converter is, in general, in the form of a bang-singular-bang (BSB) control; in which the optimal control at a given time can be either in the singular arc mode or in the bang-bang mode. Unlike prior work, the analysis and numerical results show that the singular arc portion is not negligible and can be a major portion of the optimal control solution if the maximum control level constraint is high. It is also shown that the optimal control derived for periodic excitation forces is still valid in the case of waves with non-periodic oscillatory excitation force. Simulations show that BSB control outperforms the bang-bang control, and difference in extracted energy between the BSB and the complex conjugate control is negligible. However, a main benefit of BSB control is that it finds the optimal control without the need for wave prediction; it only requires the knowledge of the excitation force and its derivatives at the current time.

The excitation force and its derivatives at the current time can be obtained through an estimator, for example, using measurements of pressures on the surface of the buoy in addition to measurements of the buoy position. The excitation force can be expressed in the Laplace domain as a summation of the Laplace transforms of harmonic functions of the wave frequencies, amplitudes, and phases. From this, it possible to compute the derivatives of the excitation force at the current time. Knowledge of the derivatives of the excitation force at the current time eliminates the need for the future prediction step when using the singular arc control. This provides a feedback control approach where only measurements at current time are needed to compute the control. Numerical experiments were conducted and the results show that the estimated excitation force accurately matches the simulated true excitation forces. A main advantage of this approximation method is the ease of obtaining accurate measurements for pressure on the buoy surface and for buoy position, compared to wave elevation measurements. Also, the excitation force is related to the integration of pressures on the buoy surface; which means that the estimated quantity is more directly related to the measurements, which further enhances the estimation process.

BRIEF DESCRIPTION OF THE DRAWINGS

The detailed description will refer to the following drawings, wherein like elements are referred to by like numbers.

DETAILED DESCRIPTION OF THE INVENTION

Figure 1:
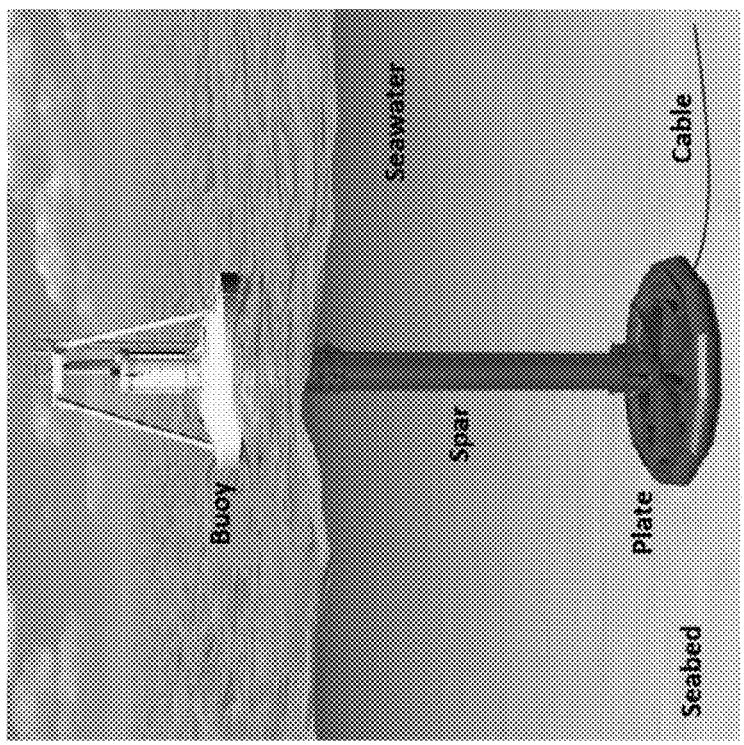
FIG. 1 is a schematic illustration of a point absorber wave energy converter.
Figure 2:
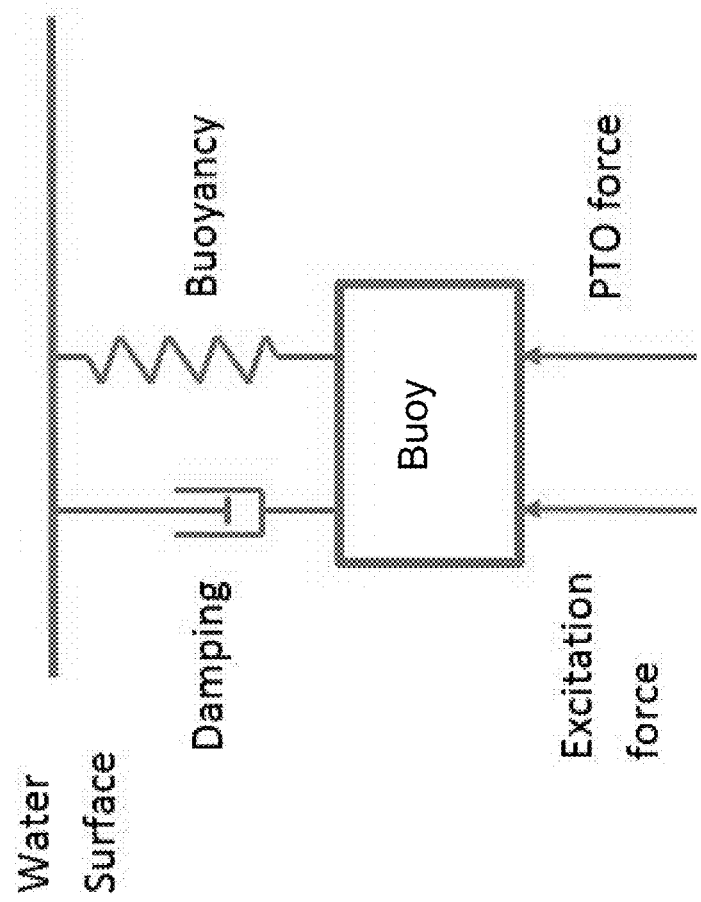
FIG. 2 is a schematic diagram of dynamic model of a wave energy converter.

Most WEC dynamic models assume linear hydrodynamic devices. Some references, however, use linear models with uncertain dynamics to account for nonlinear effects and modeling errors. See F. Fusco and J. Ringwood, *IEEE Trans. Sustain. Energy* 5(3), 958 (2014). The present invention can use a linear dynamic model. FIG. 2 illustrates a heave WEC that simplifies deriving the equations of motion. Considering only the heave motion, the forces on a point absorber (buoy or float) can be described as follows. The hydrostatic force, $f_s$, is the difference between the gravity and buoyancy forces. It reflects the spring-like effect of the fluid. Let the displacement of the buoy from the sea surface be x, the hydrostatic stiffness be k, then the hydrostatic force is $f_s=-k\,x$. The pressure effect around the immersed surface of the buoy is called the excitation force, $f_e$. A periodic excitation force can be represented by Fourier series as follows:

$$f_e = \sum_{i=1}^{n} A_i \sin(\omega_i t + \phi_i) \tag{1}$$

where $A_i$, $\phi_i$ are the amplitude and phase associated with the frequency $\omega_i$ and t is the time. The radiation force, $f_r$, is due to the radiated wave from the moving buoy. It can be modeled as:

$$f_r(t) = -\mu\ddot{x}(t) - \int_{-\infty}^{t} h_r(\tau)\dot{x}(t-\tau)d\tau \tag{2}$$

where $\mu$ is the added mass and $h_r$ is the retardation function. See W. E. Cummins, *The Impulse Response Function and Ship Motions*, Tech. Rep. DTNSDRC 1661, Department of the Navy, David Taylor Model Basin, Bethesda, Md., 1962.

Let u be the control force (PTO force in FIG. 2), positive in the opposite direction of increasing x. The motion dynamics of a buoy of mass m can be described as:

$$m\ddot{x}+f_r+f_s=u \tag{3}$$

See J. Falnes, *Ocean Waves and Oscillating Systems—Linear Interactions Including Wave-energy Extraction*, Cambridge University Press, 2002.

In order to simplify the model, it is possible to neglect the frequency dependence of the hydrodynamic damping and the added mass; in this case the dynamic model can be written in the form:

$$\tilde{m}\ddot{x}+c\dot{x}+kx=f_e-u \tag{4}$$

where $\tilde{m}$ is the buoy mass plus the added mass and c is the radiation damping coefficient. See G. Li et al., *Renew. Energy* 48(0), 392 (2012). The extracted energy over a time interval [0 T] can be computed as:

$$E = \int_0^T \{u(t)\dot{x}(t)\}dt \tag{5}$$

The optimal control is first derived using the simplified model (Eq. (4)), then it will be derived using a full model that accounts for the frequency dependence of the hydrodynamic coefficients. The objective is usually to maximize the extracted energy defined in Eq. (5). Within the framework of optimal control theory, and using the Pontryagin minimum principle, the process for computing the optimal control can be summarized as follows. First, a Hamiltonian H is constructed, which is usually a function of the system states and the co-states that are appended to handle the problem constraints. Then the necessary conditions for optimality are derived by computing the partial derivatives of H with respect to all the states, all co-states, and the control; these partial derivatives should vanish at the optimal solution. In other words, these optimality necessary conditions are a set of differential equations that the optimal solution has to satisfy. In solving this set of equations, there is an interesting case when the Hamiltonian H is a linear function in the control u. In this case, the partial derivative of H with respect to u will not have the control u in it. Hence, the necessary conditions of optimality do not yield an expression for u. In such case, the control is said to be on a singular arc.

In the heave WEC problem, the Hamiltonian is linear in the control u, and hence the optimal solution, in general, is expected to have singular arcs. Some references, however, present a bang-bang control as a solution to this heave WEC optimal control problem. See G. Li et al., Renew. Energy 48(0), 392 (2012); and E. Abraham, *Optimal Control and Robust Estimation for Ocean Wave Energy Converters*, PhD thesis, Department of Aeronautics, Imperial College, London, 2013. A bang-bang control is an on-off controller in which the control force can only take one of two fixed values, switching abruptly between them. See J. A. E. Bryson and Y.-C. Ho, *Applied Optimal Control Optimization, Estimation and Control*, CRC Press, 1975. For instance, Abraham presents a derivation for the WEC optimal control and shows that the optimal solution is a bang-bang control with no singular arcs in the optimal solution. Abraham, however, assumes a specific form for the control force which makes the search domain only a subset of the solution domain. Specifically, Abraham assumes the control as:

$$u = -Bu_2(t)x_2(t) + u_1(t)G \quad (6)$$

where $u_1(\tau) \in [-1, 1]$, $u_2(t) \in [0, 1]$, B is a constant damping coefficient, and G is a positive large constant. There is no guarantee that outside this subset there are no better solutions. Li et al. also addressed the optimal control of a heave WEC with the simplified dynamic model in Eq. (4). They find the portions of bang-bang control and ignore the portions of the singular arc assuming that the times in which singular arc happens are negligible, without rigorous proof for that. See G. Li et al., *Renewable Energy* 48(0), 392 (2012).

The present invention is directed to a method to compute the optimal control using the Pontryagin minimum principle for the heave WEC problem in its general form. It is shown that, in general, the optimal solution includes portions of bang-bang control and other portions of singular arc control. The singular arc solution is first described below for a WEC system with a periodic excitation force. The case of non-periodic excitation force is then described. Simulations for both periodic and non-periodic excitation forces are then described. Comparisons with the bang-bang only control are also described. First, the optimal control is developed for a simplified WEC model; then a more common model with radiation states is used to develop the optimal control.

Optimal Control Analysis Using Simplified WEC Models

This section describes the optimal control solution when the simplified dynamic model in Eq. (4) is used, where the radiation force is assumed to be independent of frequency. The following section describes the optimal control solution for the more general case when the radiation force is considered as a frequency-dependent force.

Let $x_1$ be the vertical (heave) position of the center of mass and $x_2$ be its vertical velocity, then the equation of motion in Eq. (4) can be written as:

$$\dot{x}_1 = x_2 \quad (7)$$

$$\dot{x}_2 = \frac{1}{m}(f_e(x_3) - cx_2 - kx_1 - u) \quad (8)$$

This is a non-autonomous system. Hence, the time variable is considered as a state, $x_3$, and the state space model of the system becomes:

$$\dot{x}_1 = x_2, \dot{x}_3 = 1 \quad (9)$$

$$\dot{x}_2 = \frac{1}{m}(f_e(x_3) - cx_2 - kx_1 - u)$$

Two exemplary cases are considered. The first case is when there are no limits on the control force while the WEC is subject to periodic excitation forces. The second case is when the excitation force is not periodic in the presence of saturation limit on the actuators.

WEC with Periodic Excitation Force and No Control Limits

The solution on the singular arc is derived below for periodic excitation forces in a similar way to that was derived to optimize vibration dampers in Kasturi. See P. D. P. Kasturi, *Sound Vib.* 215(3), 499 (1998). Assuming no limits on the control value, the optimal control problem is then defined as:

$$\text{Min:} J\left((x(t), u(t)) = \int_0^T \{L(x, u)\}dt = \int_0^{t_f} \{-u(t)x_2(t)\}dt \right. \quad (10)$$

subject to Eq. (9).

The Hamiltonian in this problem is defined as:

$$H(x_1, x_2, x_3, fu, \lambda_1, \lambda_2, \lambda_3) = \quad (11)$$

$$-ux_2 + \lambda_1 x_2 + \frac{\lambda_2}{m}(f_e(x_3) - cx_2 - kx_1 - u) + \lambda_3$$

where $\vec{\lambda} = [\lambda_1, \lambda_2, \lambda_3]^T$ are Lagrange multipliers. See J. A. E. Bryson and Y.-C. Ho, *Applied Optimal Control Optimization, Estimation and Control*, CRC Press, 1975. The necessary conditions for optimality show that the optimal solution $(x_1^*, x_2^*, x_3^*, u^*, \lambda_1^*, \lambda_2^*, \lambda_3^*)$ should satisfy the Euler-Lagrange equations:

$$H_\lambda = \dot{x} H_x = -\dot{\lambda} H_h = 0 \quad (12)$$

Evaluating the Hamiltonian partial derivatives in Eq. (12), it can be found that the optimal trajectory should satisfy the motion constraints in Eq. (9) in addition to:

$$\dot{\lambda}_1 = \frac{k}{m}\lambda_2, x_2 + \frac{\lambda_2}{m} = 0 \quad (13)$$

$$\dot{\lambda}_2 = -\lambda_1 + \frac{c}{m}\lambda_2 + u \quad (14)$$

-continued $$\lambda_3 = -\frac{1}{m}\frac{\partial f_e(x_3)}{\partial x_3}\lambda_2 \qquad (15)$$

Since the Hamiltonian H is linear in the control u, the optimality conditions (13)-(15) do not yield an expression for u, which means that the solution is a singular arc control. For this singular arc, it can be shown that the optimal control is given by:

$$u = f_e(x_3) - cx_2 - kx_1 - \frac{m}{2c}\frac{\partial f_e(x_3)}{\partial x_3} \qquad (16)$$

For periodic excitation forces, the system response is also periodic, and this periodicity of the response can be used to derive the initial conditions as follows:

$$x_1(t_0)=x_1(t_0+\tau),\ x_2(t_0)=x_2(t_0+\tau) \qquad (17)$$

See P. D. P. Kasturi, *Sound Vib.* 215(3), 499 (1998).

Substituting the optimal control u from Eq. (16) into the system model in Eq. (9), and solving for the states, gives:

$$x_2(t) = \frac{1}{2c}f_e(t) + C \qquad (18)$$

$$x_1(t) = x_1(t_0) + \frac{1}{2c}\int_{t_0}^{t} f_e(\sigma)d\sigma + Ct \qquad (19)$$

where the constant C is defined as:

$$C = x_2(t_0) - \frac{1}{2c}f_e(t_0) \qquad (20)$$

Since $t_0$ is arbitrary, it is possible to show from Eq. (19) that C=0, by setting t=$t_0$. The initial conditions are then derived from periodicity conditions and Eq. (20) as follows:

$$x_1(t_0) = -\frac{1}{2c}\sum_{i=1}^{n}\frac{A_i}{\omega_i}\cos(\omega_i t_0 + \phi_i) \qquad (21)$$

$$x_2(t_0) = \frac{1}{2c}\sum_{i=1}^{n} A_i\sin(\omega_i t_0 + \phi_i) \qquad (22)$$

The above equations describe the solution for optimal control of WEC systems, with periodic excitation forces and with no limits on the control level. The following section describes the optimal control when the excitation forces are not periodic and when there is a saturation limit on the control.

WEC with Non-Periodic Excitation Force and Saturation Control Limits

The Pontryagin's Minimum Principle shows that if there is a saturation on the control and the motion is periodic, then the optimal control is defined as:

$$u = \begin{cases} u_{sa}, & C=0; \\ \gamma, & C>0; \\ -\gamma, & C<0; \end{cases} \qquad (23)$$

where $\gamma$ is the maximum available control level, and $u_{sa}$ is the singular arc control defined in Eq. (16).

Wave excitation forces typically are not periodic. However, they have an oscillatory behavior. It is possible then, at any arbitrary time $\bar{t}$, to write:

$$x_1(\bar{t})=x_1(\bar{t}+\tilde{\tau}) \qquad (24)$$

where $\tilde{\tau}$ is a variable unknown period of time. Considering the analysis above, the value of the period $\tau$ does not impact the solution except for the constraints on the initial conditions in Eqs. (17) and (21)-(22). The variableness of $\tau$ does not impact that analysis either, except also for the constraints on the initial conditions. Hence, it is possible to state that the optimal control defined in Eq. (23) is valid for non-periodic oscillatory excitation forces. The initial conditions, however, will be constrained as in Eq. (17) only when C=0. In the other two cases of C in Eq. (23), there are no constraints on the initial conditions. Numerical analysis will be presented in the following sections to highlight this conclusion.

The solution described previously for periodic excitation forces imposed constraints on the states at initial time. Specifically, the initial states need to satisfy Eqs. (21) and (22). If a given set of initial states does not satisfy these constraints, then the optimal control solution will initialize in a bang-bang mode, not the singular arc mode. Depending on the available maximum control level, the optimal solution might switch from the bang-bang mode to the singular arc mode, as will be demonstrated through numerical simulations in a following section. The switching surface is described by Eq. (15). When the solution is on the singular arc, Eq. (15) is satisfied and the constant C is equal to zero. When Eq. (15) is not satisfied (or C≠0) then the optimal solution is the bang-bang control.

Optimal Control Analysis for WEC Models with Radiation States

The more general form of motion equations is described by Eqs. (2) and (3), where the radiation force depends on the frequency. In this case the radiation force described by Eq. (2) can be represented through adding radiation states to the model. The system model can then be represented as:

$$\dot{x}_1 = x_2 \qquad (25)$$

$$\dot{x}_2 = \frac{1}{m}(F_{ext}(x_3) - C_r\vec{x}_r - kx_1 - u) \qquad (26)$$

$$\dot{x}_3 = 1 \qquad (27)$$

$$\dot{\vec{x}}_r = A_r\vec{x}_r + B_rx_2 \qquad (28)$$

where $x=[x_1, x_2, x_3, \vec{x}_r]$ is a state vector of length n, $A_r \in \mathbb{R}^{n_r * n_r}$, $B_r \in \mathbb{R}^{n_r * 1}$, $C_r \in \mathbb{R}^{1 * n_r}$, and $n_r$=n-3. See G. Bacelli, *Optimal Control of Wave Energy Converters*, PhD, National University of Ireland, Maynooth, Maynooth, Ireland, 2014. The cost function is the same as that defined in Eq. (10).

The Hamiltonian in this case is defined as:

$$H = \qquad (29)$$
$$-ux_2 + \lambda_1 x_2 + \frac{\lambda_2}{m}(F_{ext}(x_3) - C_r\vec{x}_r - kx_1 - u) + \lambda_3 + \vec{\lambda}_r(A_r\vec{x}_r + B_rx_2)$$

where $\vec{\lambda}_r \in \mathbb{R}^{1*n_r}$ are the co-states associated with the radiation states. The optimality conditions are the state Eqs. (25)-(28) and:

$$\lambda_1 = \frac{k}{m}\lambda_2 \quad (30)$$

$$\lambda_2 = -\lambda_1 + u - \lambda_r B_r \quad (31)$$

$$\lambda_3 = -\frac{\lambda_2}{m}\frac{\partial F_{ext}(x_3)}{\partial x_3} \quad (32)$$

$$\vec{\lambda}_r = \frac{\lambda_2}{m}C_r - \lambda_r A_r \quad (33)$$

$$x_2 + \frac{\lambda_2}{m} = 0 \quad (34)$$

The optimality conditions in Eqs. (25)-(28) and (30)-(34) can be solved for the control u(t). One way to solve these equations is to use a Laplace transform to convert this system of differential equations to a system of algebraic equations in the S domain. The obtained optimal control force in the S domain, U(s), is of the form $U(s)=U_1(s)+U_2(s)$ where:

$$U_1(s) = \frac{N_1(s)}{D_1(s)} \quad (35)$$

$$N_1(s) = (ms^2 + (Cr(sI + A_r)^{-1}B_r - B_v)s + k)F_{ext}(s) \quad (36)$$

$$D_1(s) = s(C_r(sI + A_r)^{-1}B_r - C_r(sI - A_r)^{-1}B_r - 2B_v) \quad (37)$$

$$U_2(s) = \frac{N_2(s)}{D_2(s)} \quad (38)$$

$$N_2(s) = \left(\left(\lambda_{20} + \vec{\lambda}_{r0}(sI + A_r)^{-1}B_r\right)s - \lambda_{10}\right) \quad (39)$$
$$(ms^2 + (C_r(sI - A_r)^{-1}B_r + B_v)s + k)$$

$$D_2(s) = s^2(C_r(sI + A_r)^{-1}B_r - C_r(sI - A_r)^{-1}B_r - 2B_v) \quad (40)$$

The $U_2(s)$ is a transient term that depends only on the initial values of the co-states and is independent from the excitation force. So, for the steady state solution, the $U_2(s)$ term can be dropped, and $U(s)=U_1(s)$. The inverse Laplace of the $U_i(s)$ term depends on the size and values of the radiation matrices, which would vary depending on the desired level of accuracy. So, the time domain formulae for the control is deferred to the numerical case study below. In general, the inverse Laplace of $U_1(s)$ will have harmonic terms and exponential terms. All exponential terms are dropped when considering the steady state solution.

Simulation Results

Numerical simulations were conducted to demonstrate that the optimal solution of a WEC system, in general, includes portions of singular arc control in addition to the bang-bang control. Comparisons between the control of the present invention with the prior art bang-bang control are described below. The control of the present invention will be referred to as bang-singular-bang (BSB) control, versus the prior art bang-bang control. Both periodic and non-periodic excitation forces were tested. The tested bang-bang control is of the form:

$$u = \begin{cases} \gamma, & x_2 > 0; \\ -\gamma, & x_2 < 0; \end{cases} \quad (41)$$

The numerical parameters are selected as follows: the mass of the buoy is $m=2\times10^5$ kg, the stiffness of the hydrostatic force is $k=1.2\times10^5$ N/m, the damping coefficient is chosen to be $c=10^5$ Nm/s, and the maximum thrust used in bang-bang control is $\gamma=1.5\times10^5$ N. The simulation period is selected to be 50 s.

Periodic Excitation Force

Figure 3:
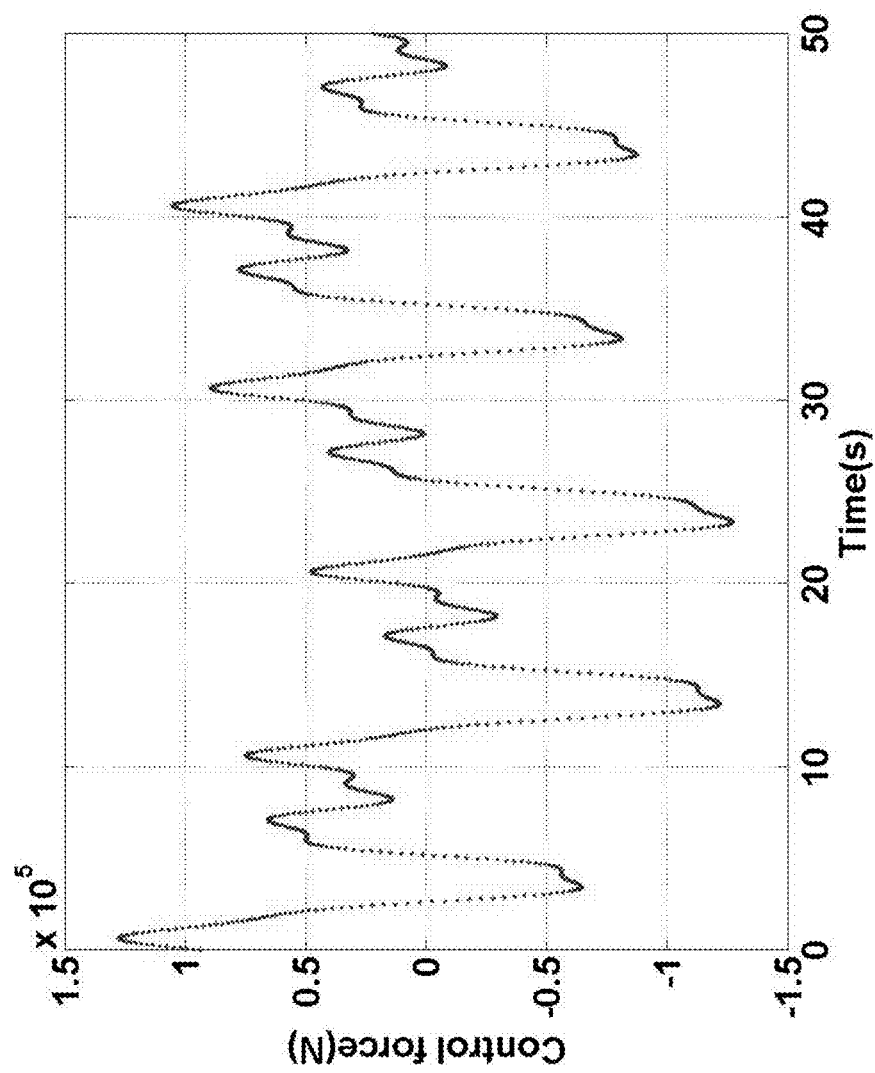
FIG. 3 is a graph of the control force as a function of time for a periodic excitation force.
Figure 4:
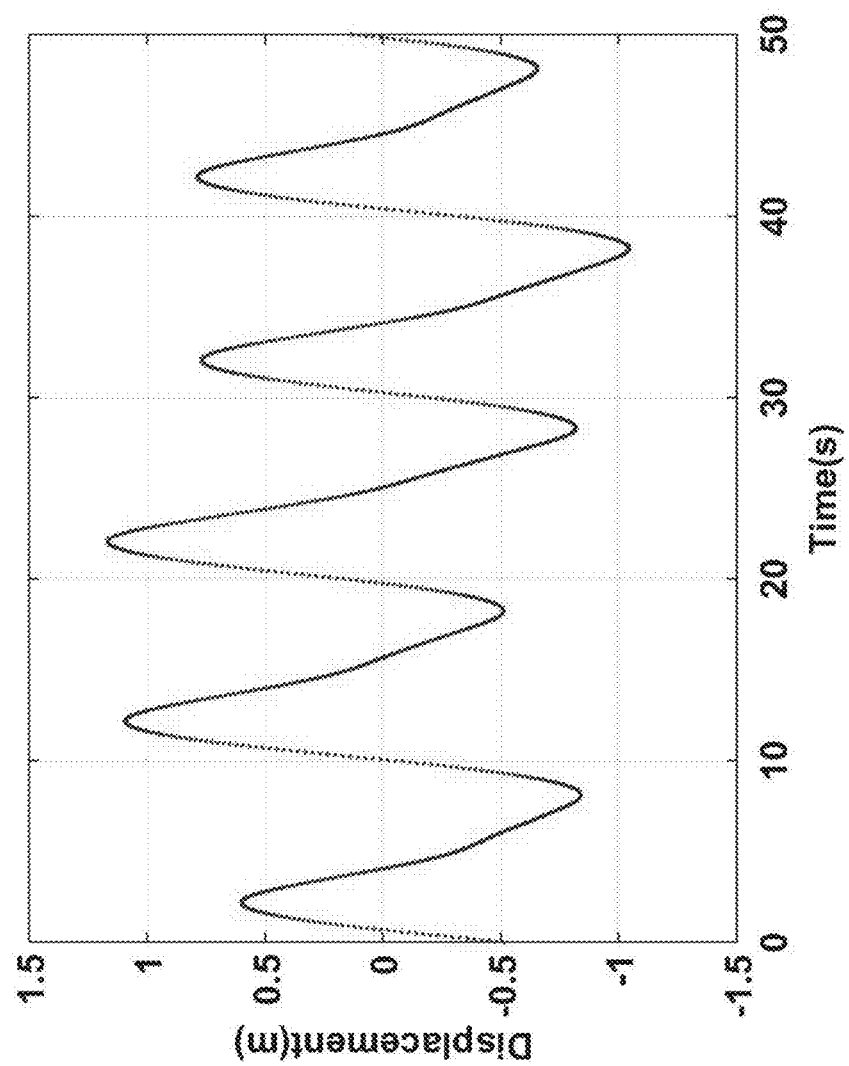
FIG. 4 is a graph of the buoy position as a function of time with a periodic excitation force.
Figure 5:
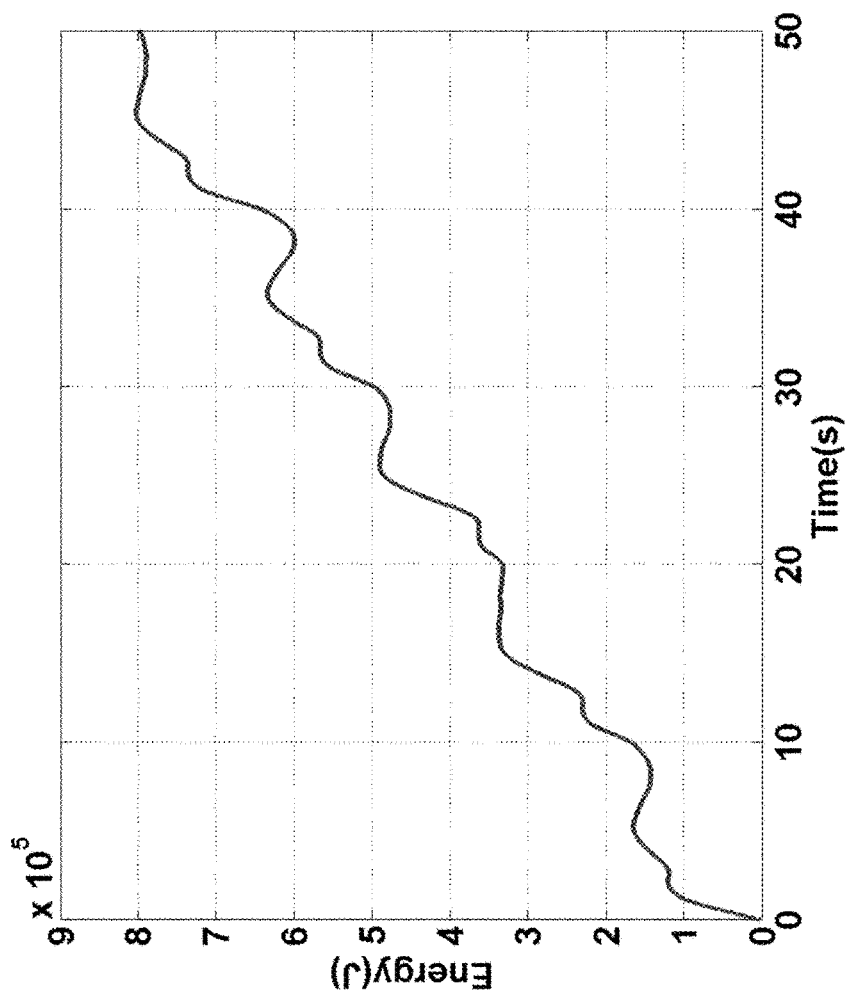
FIG. 5 is a graph of the extracted energy as a function of time for a periodic excitation force.

The initial conditions of the states $x_1$ and $x_2$ are selected to satisfy the constraints in Eqs. (21) and (22). The optimal control solution then starts with the singular arc solution. The value of $H_u$ remains zero over the whole simulation period; hence the optimal solution remains on the singular arc throughout the simulation period. As can be seen from FIG. 3, the control force is always below the control limit value, $\gamma$. If the value of $\gamma$ is reduced, the optimal control solution will switch to bang-bang mode as discussed in the sections below. FIG. 4 shows the history of the buoy position. FIG. 5 shows the accumulated extracted energy. Unlike prior work in Li et al., these results indicate that the singular arc part of the optimal control cannot be neglected and significant portions of time may become on singular arcs depending on the initial conditions and on the maximum control level. See G. Li et al., *Renew. Energy* 48(0), 392 (2012).

Arbitrary Initial Condition

For the more general case, the position and velocity states are initialized to (0, 0). In this case the periodicity conditions are not satisfied; yet the solution presented by Eq. (23) is still valid as discussed above. In this case, no limit is assumed on the control (or equivalently the limit on the control, $\gamma$, is high enough so that singular arc control is always below $\gamma$).

Figure 6:
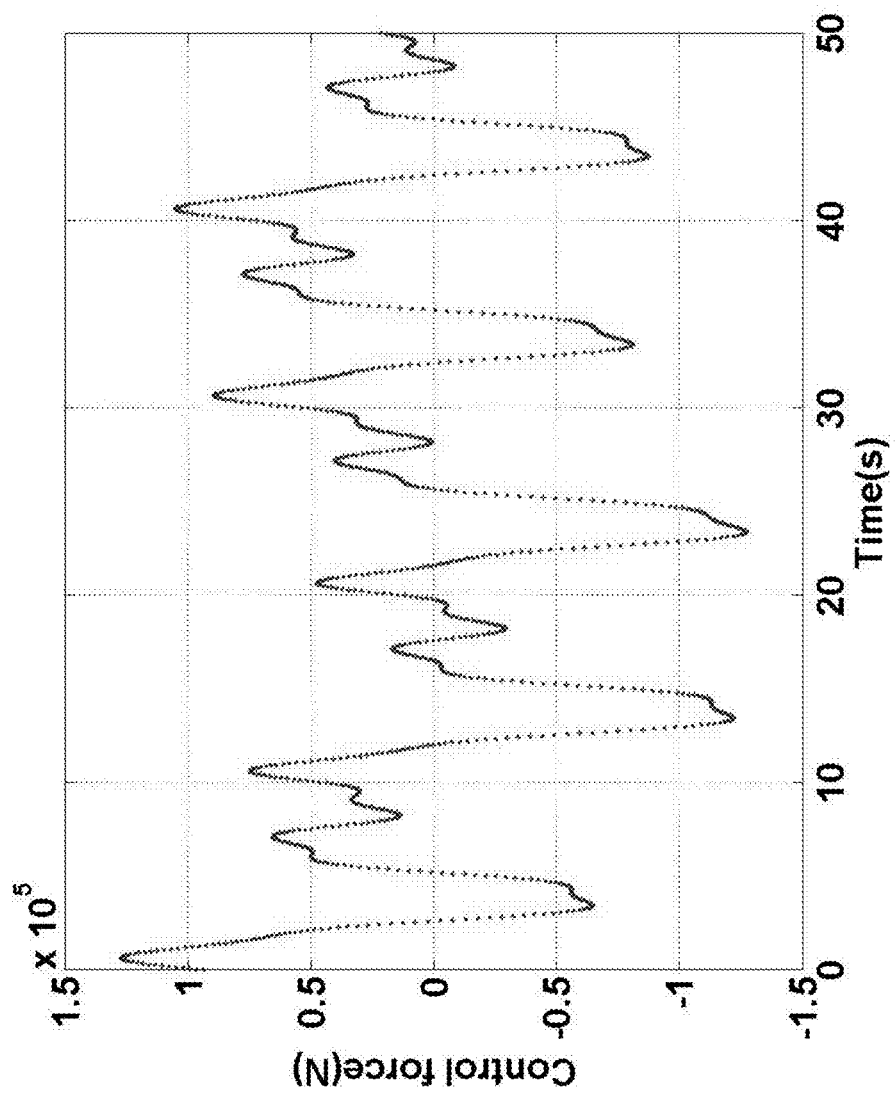
FIG. 6 is a graph of the control force as a function of time for the arbitrary initial condition.
Figure 7:
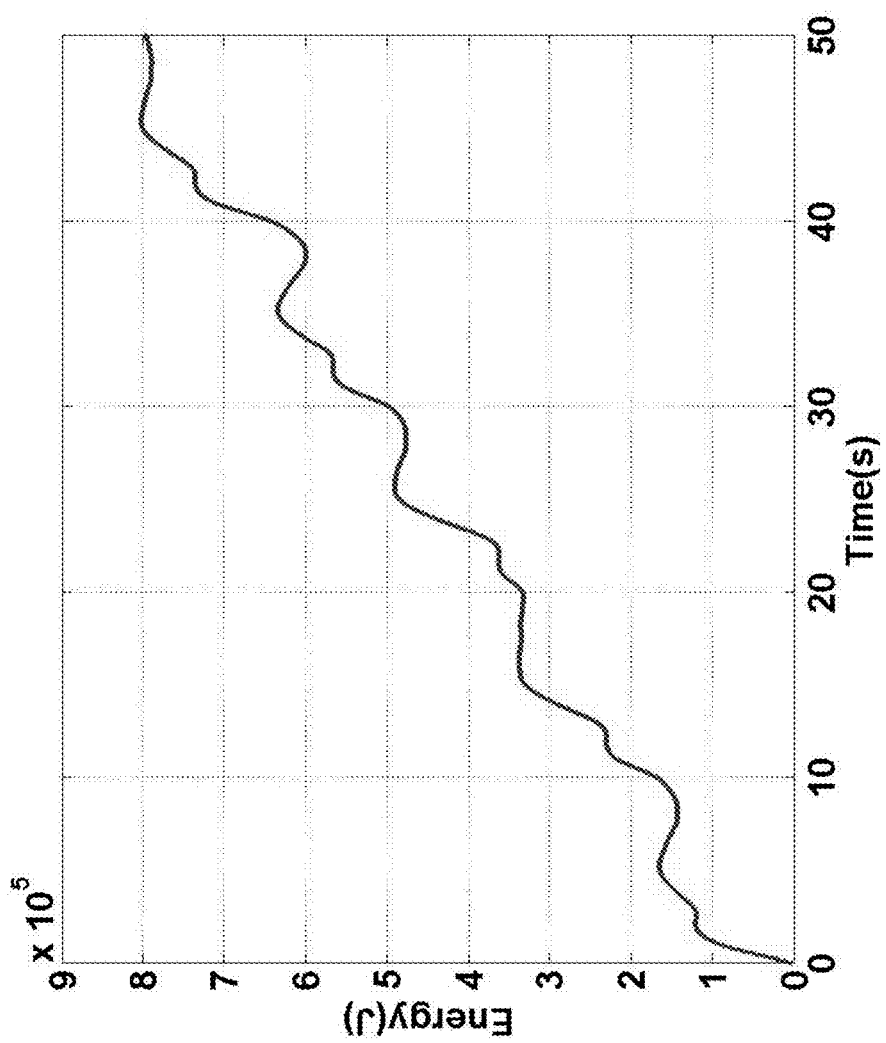
FIG. 7 is a graph of the energy as a function of time for the arbitrary initial condition.

At the very beginning of the simulations, the $H_u$ is not zero but it converges fast to the zero value. Hence the control starts in the bang-bang mode with a control value at $-1.5\times10^5$ N, for a short period of time as shown in FIG. 6; then it switches to the singular arc mode. The energy extracted in this case is shown in FIG. 7.

Constrained Control

Figure 8:
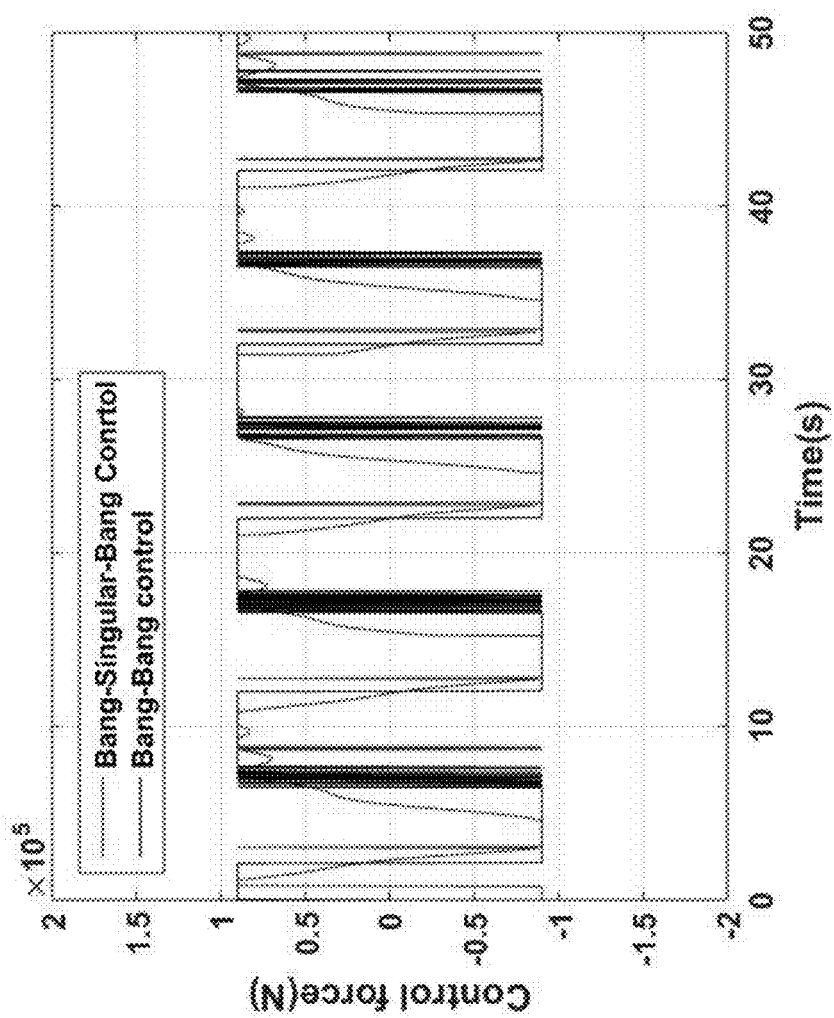
FIG. 8 is a graph of the force as a function of time for constrained control case.
Figure 9:
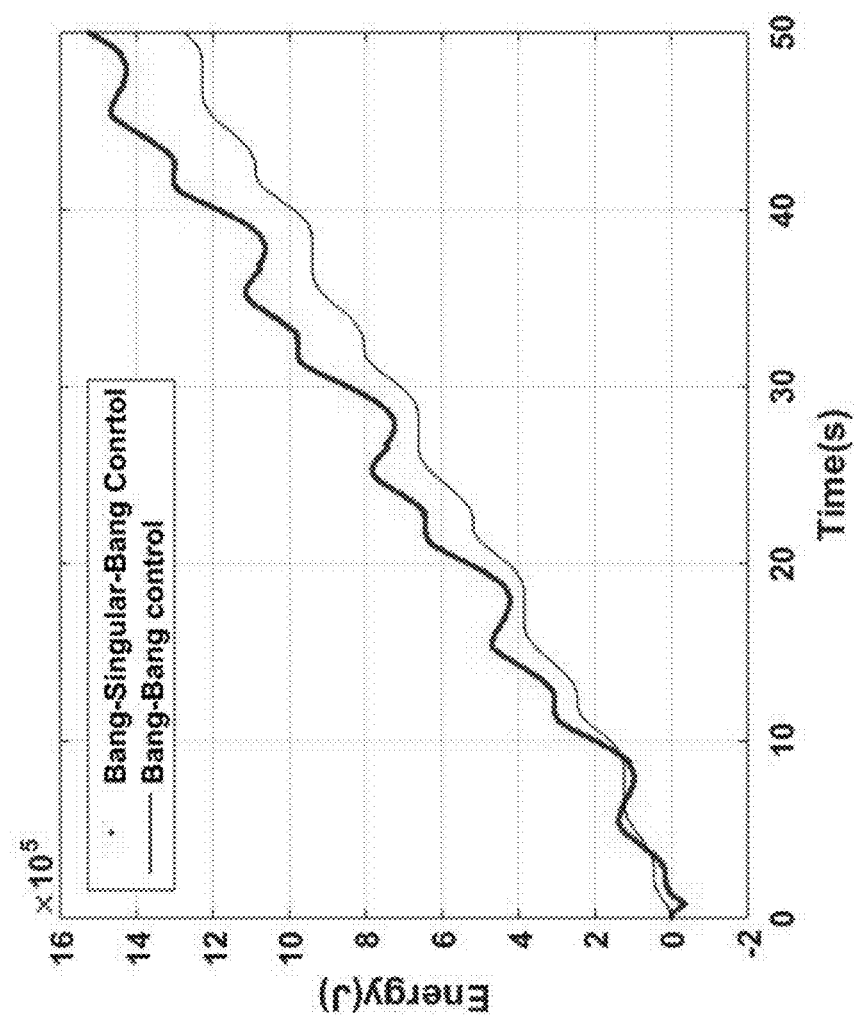
FIG. 9 is a graph of the energy as a function of time for constrained control case.

Consider the case when there exists a limit $\gamma$ on the control force. Both the bang-bang control method described by Li et al. and the BSB control method of the present invention are compared with the control force limit. See G. Li et al., *Renew. Energy* 48(0), 392 (2012). Starting from arbitrary initial conditions, both methods are tested using periodic excitation forces. The control force computed from both methods is shown in FIG. 8. The BSB control is clearly having periods of bang-bang and other periods of singular arc control. FIG. 9 shows the extracted energy using both methods. Clearly the BSB solution optimizes the objective more than the bang-bang control does.

Non-Periodic Excitation Force with Constrained Control

Figure 10:
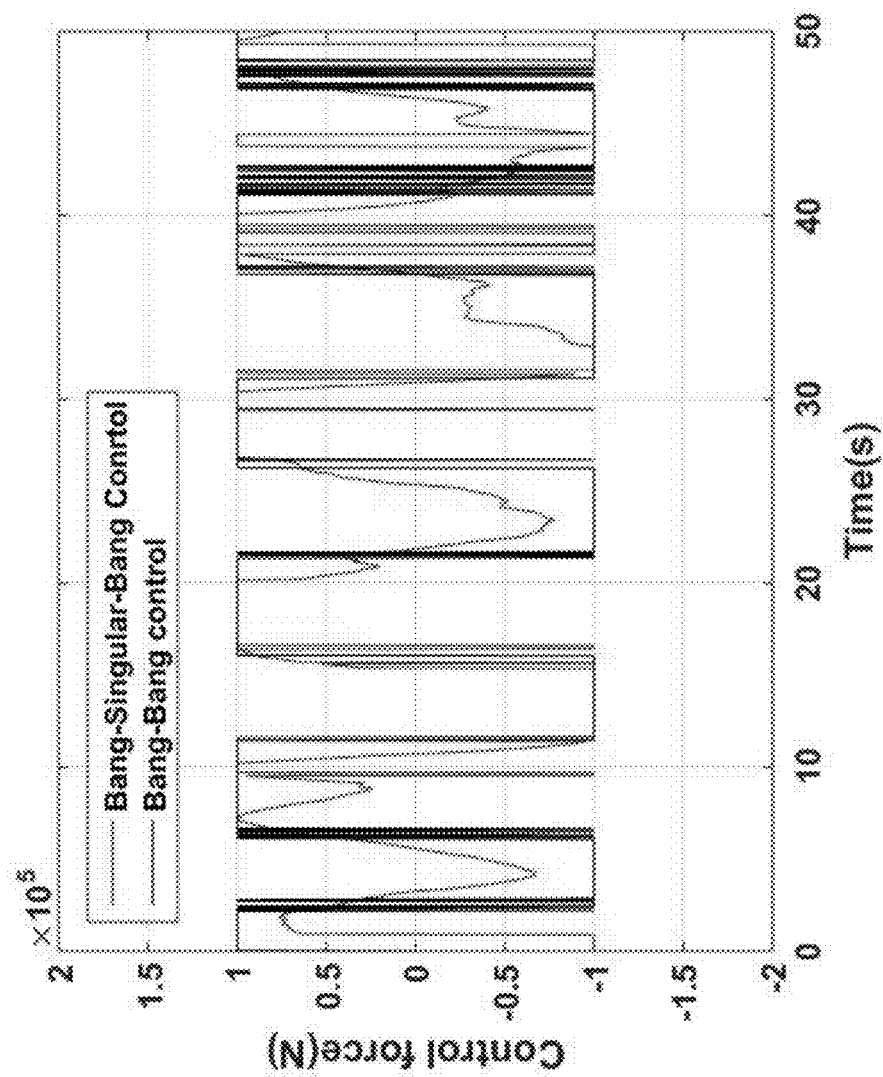
FIG. 10 is a graph of the control force as a function of time for non-periodic excitation force.
Figure 11:
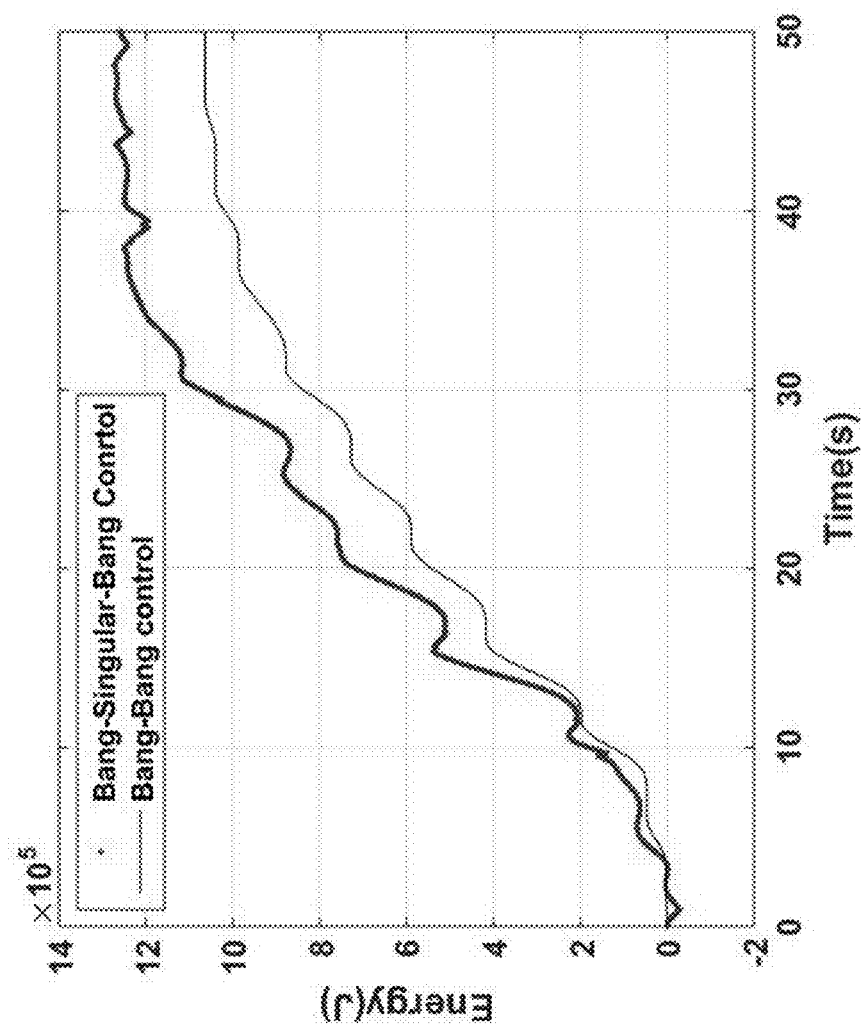
FIG. 11 is a graph of the energy as a function of time for non-periodic excitation force.

This section presents simulation results when excitation forces are not periodic. Both the bang-bang and the BSB methods are simulated. FIG. 10 shows the control for both methods. Clearly, the BSB control has periods of both bang-bang and periods of singular arc control. FIG. 11 shows the extracted energy for both methods. Again, the BSB control generates more energy.

Results Using WEC Model with Radiation States

Consider the case of a spherical buoy of radius 1 m. The equilibrium level is such that half of the sphere is submerged. The mass of the sphere in this case is $2.0944 \times 10^3$ kg. The corresponding added mass at infinite frequency is $1.1253 \times 10^3$ kg. Three radiation states are included in the system dynamics model. A regular excitation force is assumed with a frequency of $\omega = 2\pi/3$. Substituting the above data into the optimal control given in Eq. (35) and performing the inverse Laplace transform, gives:

$$u(t) = -4688.0 \sin(2.09t) + 897.0 \cos(2.09t) - 1.66e5\delta(t)$$

$$-5.14e4 \cos(0.208t)e^{-0.284t} + 5.14e4 \cos(0.208t)e^{0.284t}$$

$$-3.72e4 \sin(0.208t)e^{-0.284t} - 3.72e4 \sin(0.208t)e^{0.284t} +$$
$$3.4e6e^{-40.8t} \qquad (42)$$

The above form for u(t) has unstable terms due to the fact that the derivation did not assume any constraints on the displacement nor the control. In reality the control is limited; hence these unstable terms are dropped to yield the final form of the optimal control. The complex conjugate control is a steady state solution. For the sake of comparing the obtained control to the complex conjugate control solution, all the transient terms are dropped from Eq. (42) to obtain the final steady state singular arc control in the form:

$$u(t) = -4683.0 \sin(2.09t) + 897.0 \cos(2.09t) \qquad (43)$$

Figure 12:
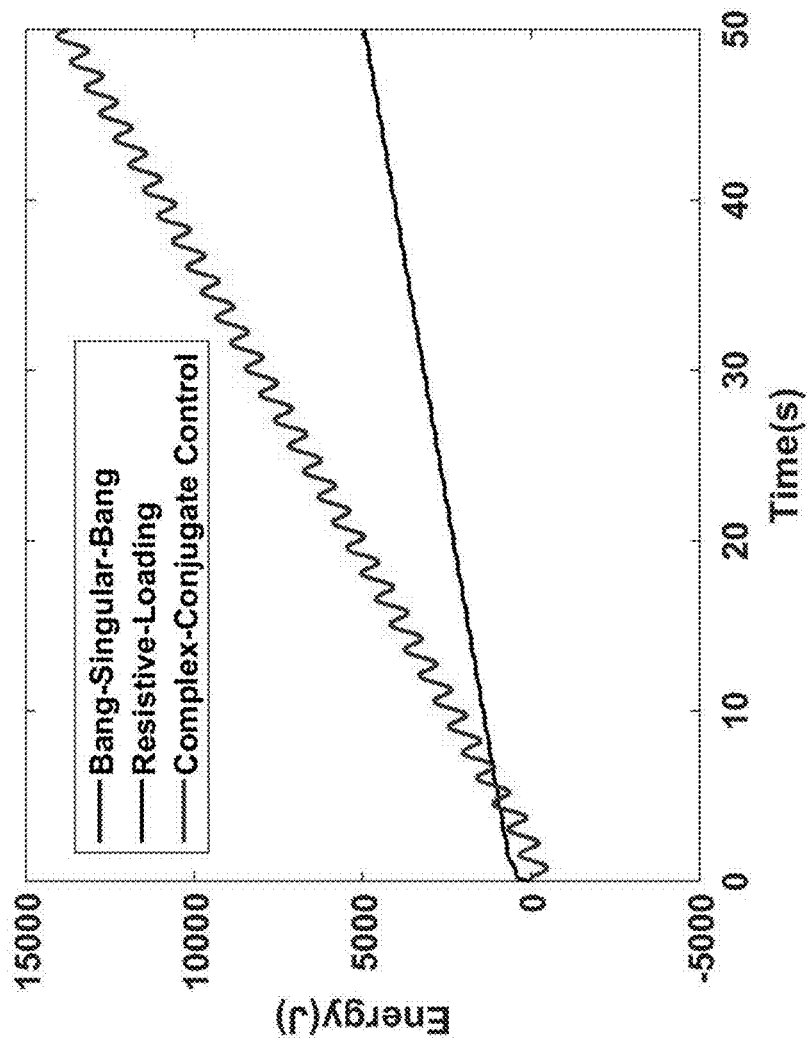
FIG. 12 is a graph of the energy difference between bang-singular-bang control and bang-bang control for frequency-dependent radiation WEC model.
Figure 13:
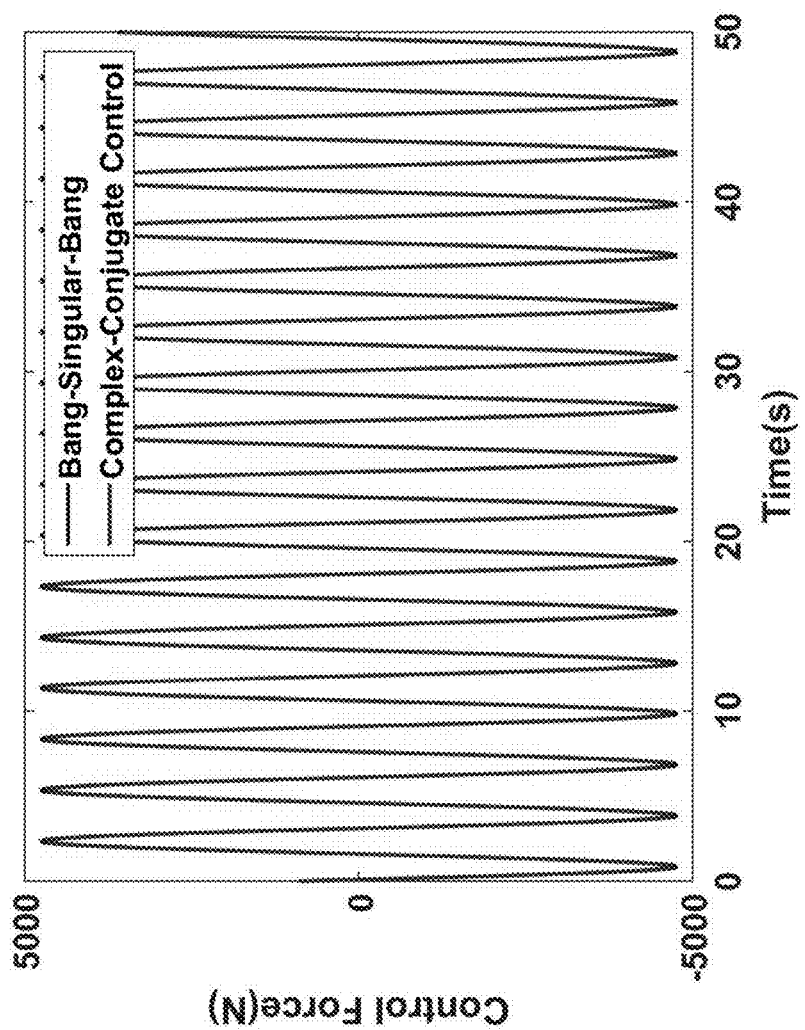
FIG. 13 compares the bang-singular-bang control and the complex conjugate control.
Figure 14:
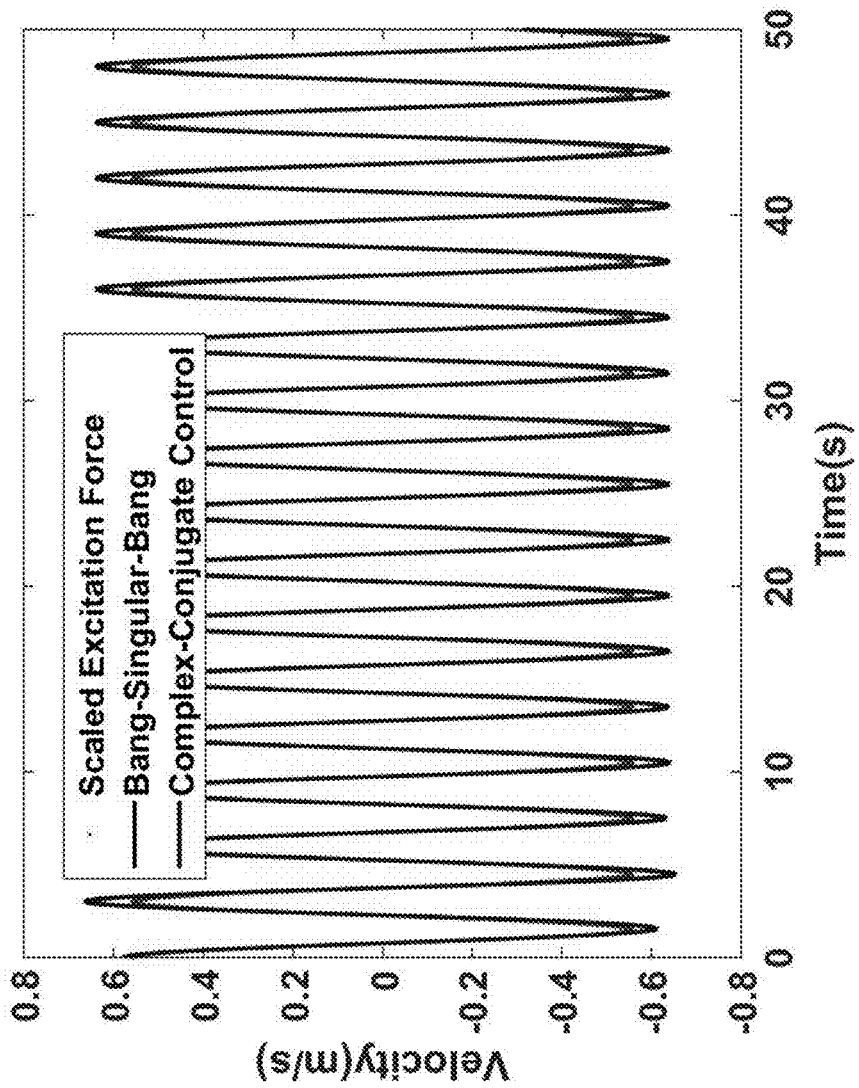
FIG. 14 compares the velocity of the buoy as simulated using both the complex conjugate control and the bang-singular-bang control.

This control is simulated and the results are shown below. The analysis of this problem in the frequency domain yields the complex conjugate control as the optimal control. In FIG. 12, the singular arc control is compared to the resistive loading control and the theoretical limit as computed from the complex conjugate control, in terms of extracted energy. The energy extracted from the singular arc control coincides with that obtained from the complex conjugate control. It is noted that the singular arc solution is referred to as BSB control since a limit on the control was assumed; this limit is assumed high enough in this case to demonstrate the singular arc control characteristics shown in FIG. 13. FIG. 13 shows that the control of the BSB control coincides with that of the complex conjugate control. FIG. 14 compares the velocity of the buoy as simulated using both the complex conjugate control and the BSB control; plotted also in FIG. 14 is the excitation force (scaled) to demonstrate that the velocities are in phase with the excitation force; which is the resonance condition for the complex conjugate solution.

As can be seen above, the BSB solution is in the form of:

$$u(t) = b_{BSB} \sin(\omega t) + a_{BSB} \cos(\omega t) \qquad (44)$$

The complex conjugate control can also be represented as:

$$u(t) = b_{CC} \sin(\omega t) + a_{CC} \cos(\omega t) \qquad (45)$$

Hence, the comparison between the two methods can be carried out through comparing the coefficients for different excitation force frequencies. Table 1 summarizes the coefficients for both methods for different frequencies. There are small differences in the coefficients values between the two methods because the BSB uses a 3×3 radiation states system; this difference, however, is negligible as can be seen in FIG. 12. The two methods produce essentially the same solution.

TABLE 1

Singular arc and complex conjugate solutions for different exciting frequencies.

| $\omega$ | $\dfrac{2\pi}{2}$ | $\dfrac{2\pi}{3}$ | $\dfrac{2\pi}{4}$ |
|---|---|---|---|
| $a_{CC}$ | 507.2073 | 897.1070 | 1.1349e+03 |
| $b_{CC}$ | 91.8833 | −4.6111e+03 | −1.5609e+04 |
| $a_{BSB}$ | 507.2073 | 897.1070 | 1.1349e+03 |
| $b_{BSB}$ | 35.8059 | −4.6834e+03 | −1.7024e+04 |

The implementation of complex conjugate control usually requires wave prediction as described in several references. See F. Fusco and J. V. Ringwood, *IEEE Trans. Sustain Energy* 1(2), 99 (2010); and U. A. Korde, "Up-wave surface elevation for smooth hydrodynamically control of wave energy conversion in irregular waves, In: *IEEE Proceedings of OCEANS*, San Diego, Calif. 2013. The BSB control of the present invention assumes knowledge about the excitation force and its derivatives at the current time; which can be obtained using an estimator (an estimator using pressure measurements is described below). Hence, no wave prediction is needed in the BSB control. This is a significant advantage compared to other optimal control strategies, such as the model predictive control. See J. A. M. Cretel et al., "Maximization of energy capture by wave-energy point absorber using model predictive control", in: IFAC World Congress, 2011. Finally, this BSB control method is applicable only when a linear dynamic model is valid. Hence, it is assumed that the displacement of the buoy is small at all times. When the displacement is large, this linear assumption might be violated.

Estimation of Excitation Forces for WEC Control

Most prior art control algorithms for wave energy converters require prediction of wave elevation or excitation force for a short future horizon, to compute the control in an optimal sense. The method of the present invention uses an estimation of the excitation force and its derivatives at present time with no need for prediction to compute the control. According to the invention, an extended Kalman filter can be used to estimate the excitation force. As an example, the measurements are selected to be the pressures at discrete points on a buoy surface, in addition to the buoy heave position. The pressures on the buoy surface are more directly related to the excitation force on the buoy as compared to wave elevation in front of the buoy. These pressure measurements are also more accurate and easier to obtain. Singular arc control can be used to compute the steady-state control using the estimated excitation force. The estimated excitation force is expressed in the Laplace domain and substituted in the control, before the latter is transformed to the time domain. As an example, numerical simulations are presented for a Bretschneider wave case study.

As described above, waves can be a reliable source of renewable energy. A key technology is the control system used to maintain economic energy-harvesting levels. To achieve that, the control system needs to be designed so as to maximize the energy harvesting. To highlight the challenges in optimizing the control of a wave energy converter (WEC), consider the dynamic equation describing a WEC in a one-degree-of-freedom heave motion (known as the Cummins' equation of motion):

$$(m+\tilde{a}(\infty))\ddot{x}_1 = f_e + u - B_0\dot{x}_1 - Kx_1 - \int_0^\infty h_r(\tau)\dot{x}_1(t-\tau)d\tau \qquad (46)$$

where $x_1$ is the heave displacement, m is the buoy mass, K is the hydrostatic stiffness due to buoyancy, $\tilde{a}(\infty)$ is the added mass at infinite frequency, $f_e$ is the excitation force, u is the control force, $B_v$ is a viscous damping coefficient, and $h_r$ is the radiation impulse response function (radiation kernel). See W. Cummins, *The impulse response function and ship motions* (Report; David W. Taylor Model Basin), Navy Department, David Taylor Model Basin (1962). The radiation term is called the radiation force, $f_r$, and the buoyancy stiffness term is called the hydrostatic force. The control problem is to compute the history of the control force u(t) over the interval [0 T] such that the harvested energy is maximized over the same interval.

The radiation force term is frequency dependent. For control optimization, a short time prediction of the incoming waves is crucial. See F. Fusco and J. V. Ringwood, *IEEE Transactions on Sustainable Energy* 1(2), 99 (2010). In fact, many existing control strategies do require some sort of prediction in the future of the wave elevation or the excitation forces in order to compute the control in an optimal sense. For instance, Li et al. implements dynamic programming, while Hals et al, uses a gradient-based algorithm in searching for the optimal control, given a wave elevation prediction over a finite future horizon at each control time step. See G. Li et al., *Renewable Energy* 48(0), 392 (2012); and J. Hals et al., *Journal of Offshore Mechanics and Arctic Engineering* 133(1), 1 (2011). A model predictive control (MPC) can be used to compute the optimal control, given a prediction for the wave over a finite horizon as in Cretel et al. Soltani et al., and Kracht et al. See J. A. M. Cretel et al., *Maximization of energy capture by a Wave-energy point absorber using model predictive control*, IFAC World congress, Milano, Italy (2011); M. N. Soltani et al., "Model predictive control of buoy type wave energy converter" In *The 19th international federation of automatic control (IFAC) World congress, Cape Town, South Africa*, International Federation of Automatic Control (IFAC), Cape Town, South Africa (2014); and P. Kracht et al., *First results from wave tank testing of different control strategies for a point absorber wave energy converter*, 2014 Ninth international conference on ecological vehicles and renewable energies (EVER) (pp. 1-8), Monte-Carlo, Monaco (2014). Bacelli et al. utilized the pseudo spectral method, whereas Abdelkhalik et al. developed a shape-based approach that exploits the available wave prediction data to work with a fewer number of approximated states compared to the pseudo-spectral method. See G. Bacelli et al., "A control system for a self-reacting point absorber wave energy converter subject to constraints," *Proceedings of the* 18*th IFAC World Congress* (pp. 11387-11392), Milano, Italy (2011); O. Abdelkhalik et al. "Control optimization of wave energy converters using a shape-based approach," in *ASME power & energy* 2015, San Diego, Calif.: ASME (2015); and O. Abdelkhalik et al., *Journal of Ocean Engineering and Marine Energy* 1 (2016). As described above, Abraham has proposed bang-bang control as a suboptimal control in the presence of limitations on the control actuation level, where wave prediction was assumed available. See E. Abraham, *Optimal control and robust estimation for ocean wave energy converters* (Doctoral dissertation), Department of Aeronautics, Imperial College, London (2013). In all of the above control methods, a prediction for the wave elevation or excitation force is needed.

In recent WEC research, it has been common to predict the wave elevation; and then use that to estimate the excitation force. See A. K. Brask, *Control and estimation of wave energy converters*, Norwegian University of Science and Technology, Department of Marine Technology, Trondheim, Norway (2015). Deterministic sea wave prediction (DSWP) has been studied extensively, in which the water surface elevation is measured at one or more locations, and then those measurements are propagated forward using a wave dispersion model. Zhang et al. developed a directional hybrid wave model for short-crested irregular ocean waves for use in DSWP. See J. Zhang et al., *Applied Ocean Research* 21(4), 167 (1999). The disadvantage of using the standard discrete spectral DSWP processing techniques is that they force a periodic structure on the sea surface prediction models while the sea is aperiodic in nature. See M. Belmont et al., *Ocean Engineering* 33(17-18), 2332 (2006). This can be alleviated by using finite impulse response prediction filters to provide the necessary dispersive phase shifting required in DSWP systems. See M. Belmont et al., *Ocean Engineering* 33(17-18), 2332 (2006). More recently, Halliday et al. investigated the use of Fast Fourier Transform (FFT) in making predictions of wave elevation and concluded that the method is not always reliable. Specifically, the periodic nature of the FFT does not fit with the non-periodic measured signal. See J. R. Halliday et al., *Renewable Energy* 36(6), 1685 (2011). There are still, however, other challenges in using DSWP such as the need for many wave measurement buoys to make predictions for one location, in addition to adjusting the prediction model for the location of the VVEC as it moves around in its watch circle. See B. A. Ling, *Real-time estimation and prediction of wave excitation forces for wave energy control applications*, Corvallis, Oreg.: Oregon State University (2015). For wave prediction, LIDAR devices also can be used to scan the incident wave field in front of a NEC, and then propagate the measured wave field forward in space and time using a wave model for prediction. See M. R. Belmont and P. Ashwin, *Journal of Atmospheric and Oceanic Technology* 28(12), 1672 (2011). Predictions with LIDAR, however, are less accurate and have their own challenges. See M. Belmont et al., *Journal of Atmospheric and Oceanic Technology* 31(7), 1601 (2014). The collected measurements, from a single VVEC, for wave elevation over time can be recognized as a stochastic time series, and hence can be used for forecasting wave elevation in the future. See F. Fusco and J. Ringwood, *A study on short-term sea profile prediction for wave energy applications,* 8th European wave and tidal energy conference (EWTEC), Uppsala, Sweden (2009). There are a number of candidate techniques that can be used for this type of problem, such as the extended Kalman filter (EKF), the linear autoregressive model, and neural networks. See F. Fusco and J. Ringwood, *A study on short-term sea profile prediction for wave energy applications,* 8th European wave and tidal energy conference (EWTEC), Uppsala, Sweden (2009); and S. Hadadpour et al., "Wave energy forecasting using artificial neural networks in the Caspian Sea," in *Proceedings of the Institution of Civil Engineers-Maritime Engineering* (Vol. 167, pp. 42-52), London: Institute of Civil Engineers (2014).

Recently, Ling used an EKF, with a simplified linear frequency-invariant state-space model, for estimating the excitation force on a point absorber VVEC. See B. A. Ling, *Real-time estimation and prediction of wave excitation* forces for wave energy control applications, Corvallis, Oreg.: Oregon State University (2015); and B. A. Ling and B. A. Batten, "Real time estimation and prediction of wave excitation forces on a heaving body," in *ASME 2015 34th international conference on ocean, offshore and arctic engineering* (Vol. 9), Ocean renewable energy, ASME: St. John's, Newfoundland (2015). The estimated excitation force is then used for predicting the excitation force in the future. The measurements are the WEC positions and velocities over time. The excitation force is modelled as a summation of three modes at different frequencies; the frequencies are allowed to change over time in the EKF model. The results show that this approach makes accurate predictions of excitation force over short time horizons. See B. A. Ling, *Real-time estimation and prediction of wave excitation forces for wave energy control applications*, Corvallis, Oreg.: Oregon State University (2015); and B. A. Ling and B. A. Batten, "Real time estimation and prediction of wave excitation forces on a heaving body," in *ASME 2015 34th international conference on ocean, offshore and arctic engineering* (Vol. 9), Ocean renewable energy, ASME: St. John's, Newfoundland (2015).

Estimation of Excitation Forces for WEC Control Using Pressure Measurements

The present invention can use pressure measurements collected only at the WEC location to estimate the excitation force on the buoy surface, and then use the estimated excitation force with a controller that maximizes the energy harvesting. As pointed out in Fusco and Ringwood, it is possible to use past time history of wave elevation measurements collected at the WEC location only to forecast wave elevation over a short future horizon. See F. Fusco and J. V. Ringwood, *IEEE Transactions on Sustainable Energy* 1(2), 99 (2010). The present invention, however, does not need to use wave elevation measurements. Rather, the invention can measure the pressure values at different locations on the buoy surface, in addition to the position of the buoy itself. The excitation force on the buoy surface is the quantity to be estimated. The estimated excitation force at the current time can then be fed to a singular arc control algorithm, as described above. This control does not require the prediction of the excitation force in the future; but rather it evaluates the derivatives of the excitation force at the current time and uses them to compute the control in an optimal sense. Computing the derivatives at a current time provides information about the future. See D. Mugler and W. Splettstosser, *IEEE Transactions on Information Theory* 33(3), 360 (1987). This method has several advantages. First, it is easy to collect accurate measurements for pressures on the buoy surface and for the buoy position. Second, the linear wave theory provides a mathematical model for the pressure distribution on the buoy surface which can be used to enhance the estimation of excitation forces. Also, the excitation force is related to the integration of pressures on the buoy surface; which means that the estimated quantity is more directly related to the measurements, which also enhances the estimation process. Finally, this control method eliminates the wave prediction step, and hence it saves on the computational cost. This method can be thought of as a feedback control strategy since current measurements are fed back to the filter which produces estimates to the controller. As an example of the invention, the method was tested on a Bretschneider wave and the results show that the harvested energy is close to that of a complex conjugate control, in the absence of motion and control constraints.

An estimator should be accurate yet fast, so that it fits in a real-time implementation. The function of the estimator is to compute the best estimate $\hat{X}$ for the system state vector, $\vec{X}$, given a system's truth model:

$$\dot{\vec{X}} = \vec{f}(\vec{X}(t), u(t), t) + \vec{\omega}(t) \tag{47}$$

and the measurements vector:

$$\vec{y} = \vec{h}(\vec{X}(t), t) + \vec{v}(t) \tag{48}$$

where $\vec{\omega}(t)$ is the process noise, $\vec{v}(t)$ is the measurement noise, and u is the control input. The system's truth model is usually developed from the physical laws known to govern the system's behavior. See J. L. Crassidis and J. L. Junkins, *Optimal estimation of dynamic systems*, Boca Raton, Fla.: Chapman & Hall/CRC (2004). One classification for the estimation problem is linear versus nonlinear problems, depending on whether the system's model and/or measurements' model are linear or nonlinear functions of the states. See Y. Bar-Shalom et al., *Estimation with applications to tracking and navigation, theory algorithms and software*, New York, N.Y.: John Wiley & Sons (2001). One of the popular linear filters is the Kalman filter (KF). See R. E. Kalman, *Journal of Basic Engineering* 82(Series D), 35 (1960). Another example is the $H_\infty$ filter, which reduces to a Kalman filter with proper selection of the weight matrices. See D. Simon, *Optimal state estimation, Kalman, $H_\infty$ and nonlinear approaches*, New Jersey, N.Y.: John Wiley & Sons (2006). The system is considered nonlinear if the function $\vec{f}(\vec{X}(t), u(t), t)$ and/or the function $\vec{h}(\vec{X}(t), t)$ is a nonlinear function of the states vector $\vec{X}$. Of the most popular nonlinear estimation algorithms is the extended Kalman filter (EKF). Another classification for the estimation algorithm is sequential vs. batch estimators, depending on whether the measurements are processed all in a batch, or the states are updated each time a measurement is obtained. The batch filters are more computationally intense and might not be suitable for real-time implementation. The EKF is a sequential filter, and is the estimator used in the example described below.

Estimation of Excitation Forces for WEC

To build the EKF for this problem, it is necessary to have a model for the WEC system and a model for the measurements, in addition to the EKF update equations. Each of those is detailed in a separate section below. To improve the performance of the EKF, the velocity can be added as a pseudo measurement.

Define the state vector $\vec{X}$ as $$\vec{X} = [x_1, x_2, x_{r1}, \ldots, x_{rN}, a_1, \ldots, a_\aleph, \omega_1, \ldots, \omega_\aleph, \phi_1, \ldots, \phi_\aleph]^T \tag{49}$$

where $x_1$ is the buoy position, $x_2$ is the buoy velocity, $\vec{x}_r = [x_{r1}, \ldots, x_{rN}]^T$ are the radiation states, $a_i$ is the wave amplitude at frequency $\omega_i$, and $\phi_i$ is the phase associated with $\omega_i$. The EKF estimates the most $\aleph$ dominating frequencies in the wave; $\aleph$ is a design parameter. The heave dynamic equations in terms of the state vector $\vec{X}$ can be written as $$\dot{x}_1 = x_2 \tag{50}$$

$$(m + \tilde{a}(\infty))\dot{x}_2 = f_T \tag{51}$$

$$\dot{a}_i = 0, \forall_i = 1 \ldots \aleph \tag{52}$$

$$\dot{\omega}_i = 0, \forall_i = 1 \ldots \aleph \quad (53)$$

$$\dot{\phi}_i = 0, \forall_i = 1 \ldots \aleph \quad (54)$$

where $f_T$ is the total heave force on the buoy including the excitation force, radiation force, hydrostatic force, viscous damping force, and control force. The changes in the frequencies, amplitudes, or phases states are usually slow and small; and hence these changes are modelled as noises; these noises are added to the above mathematical model to generate a truth model as detailed below. See B. A. Ling, *Real-time estimation and prediction of wave excitation forces for wave energy control applications*, Corvallis, Oreg.: Oregon State University (2015).

The excitation force is two components. The first component is the Froude Krylov force which is due to the potential field of the wave flow. The second component is the diffraction force. For low frequencies, the diffraction forces are small compared to the Froude Krylov force. See J. Falnes, *Ocean waves and oscillating systems—linear interactions including wave-energy extraction*, Cambridge: Cambridge University Press (2002). In this example, the diffraction forces are neglected, and hence the excitation force refers to the Froude Krylov force. The excitation force is modelled as the integration of the excitation pressure over the wet buoy surface. The excitation pressure distribution on the buoy surface can be computed in terms of the state vector $\vec{X}$ using a potential flow theory as follows. The surface is divided into a grid of cells, where each cell is assumed to have uniform pressure over its area. Each cell is identified by two indices j and k; the index j determines the vertical position of a cell and k denotes the surface number at a certain vertical position j. The excitation force is then computed as $$f_e = \sum_j \sum_k A_{jk} \vec{n}_{jk} \hat{k} \quad (55)$$

$$\sum_{n=1}^N \left( \rho g a_n \frac{\cosh(X_n(x_1 + z_{jk} + h))}{\cosh(X_n h)} \cos(X_n x_{j,k} - \omega_n t + \phi_n) \right)$$

where the vector $\vec{n}_{jk}$ is the normal to the surface #jk, $X_n$ is the wave number, $X_n = 2\pi/\lambda_n$ where $\lambda_n$ is the wavelength associated with the frequency $\omega_n$, $\hat{K}$ is the downward unit vector which is $[0;0;-1]$, h is the mean water level height, $x_{j,k}$ and $z_{j,k}$ are the coordinate of the cell #jk, and $X_n$ has to satisfy the dispersion relation $$\omega_n^2 = g \cdot X_n \cdot \tan h(hX_n) \quad (56)$$

See H. E. Krogstad and Ø. A. Arntsen, *Linear wave theory* (2000).

The hydrostatic force can be modelled as $$f_s = \sum_j \sum_k A_{jk} \vec{n}_{jk} \hat{k} (-\rho g (x_1 + z_{j,k})) \quad (57)$$

One way to model the radiation force $f_r$ is to introduce a radiation state-space model in which $\vec{x}_F$ is a state vector subject to:

$$\dot{\vec{x}}_r = A_r \vec{x}_r + B_r x_2 \quad (58)$$

$$f_r = C_r \vec{x}_r \quad (59)$$

where the radiation matrices in Eq. (58) are obtained by approximating the impulse response function in the Laplace domain $H_r(s)$ as follows:

$$H_r(s) = \frac{p_n s^n + p_{n-1} s^{n-1} + \ldots + p_1 s + p_0}{q_m s^m + q_{m-1} s^{m-1} + \ldots + q_1 s + q_0} \quad (60)$$

where n<m. Finally, a process noise $\vec{\omega}(t)$ is added to the mathematical model, as shown in Eq. (47). See Z. Yu and J. Faines, *Applied Ocean Research* 17(5), 265 (1995); T. Perez and T. I. Fossen, *Identification of dynamic models of marine structures from frequency-domain data enforcing model structure and parameter constraints* (Technical Report 2009-01.0), ARC Centre of Excellence for Complex Dynamic Systems and Control, New Castle, Australia (2009).

The radiation force on the buoy is a function of the buoy motion and hence it can be computed in real time. The hydrostatic force is also a function of the buoy position and hence it can be computed as a function of the buoy state. The excitation force, on the other hand, is a function of the buoy motion as well as the wave potential field. Therefore, it is necessary to know the wave and its potential field in order to compute the excitation force so that the control force u(t) can be computed. Hence, measurements are collected to estimate the excitation force. Typically, buoy position is measured. The buoy position, however, is a result of the interaction of the wave with the buoy body and hence it is not a direct measurement of the excitation force. Sensing the pressure at few points on the buoy surface provides measurements that are more direct to the excitation force.

In this analysis, it is assumed that the measurements are the position of the buoy, the pressure values at N points distributed on the buoy surface. The pressure at each point is measured using a pressure sensor. The locations of the pressure sensors are known. Hence, the output model for this system is constructed as follows:

$$\vec{y} \equiv [x_1, p_1, p_2, \ldots, p_N]^T \quad (61)$$

$$= [h_1(\vec{X}), h_2(\vec{X}), \ldots h_{N+1}(\vec{X})]^T$$

where the pressure at a cell of vertical distance $c_j$ from the center of gravity is $$p_j = \sum_{n=1}^{\aleph} \rho g a_n \frac{\cosh(\chi_n(x_1 + c_j + h))}{\cosh(\chi_n h)} \times \cos(-\omega_n t + \phi_n) - \quad (62)$$

$$\rho g (x_1 + c_j) - \frac{B_v x_2}{A} - \frac{C_r \vec{x}_r}{A}$$

where A is the total surface area of the buoy. The first term in Eq. (62) is the excitation pressure; the last term is the radiation pressure; the second term is the hydrostatic pressure, and the third term is the viscous damping pressure. The output model described above is related to the actual measurements, $\vec{y}$, through Eq. (63).

$$\vec{y} = \vec{y} + \vec{v}(t) \quad (63)$$

where $\vec{v}(t)$ is the vector of sensors noises.

To implement the EKF, it is necessary to compute the partial derivatives of the functions in the dynamic model (right hand sides of Eqs. (50)(54)) with respect to the state vector defined in Eq. (49). These derivatives are collected in the Jacobian matrix F. Note that the pressure on a vertical surface does not contribute to the heave motion. In this analysis with a focus on the heave motion, the cells on non-vertical surfaces will be referred to as heave effective cells. Assuming that the pressure sensors that are on heave-effective cells are always submerged in the water, then F can be computed as shown in Eq. (64), where $$F = \begin{bmatrix} 0 & 1 & 0 & 0 & 0 & 0 & 0 & 0 & 0 & 0 & 0 & 0 & 0 & 0 \\ \frac{\partial f_T}{\partial x_1} & \frac{\partial f_T}{\partial x_2} & \frac{\partial f_T}{\partial x_{r1}} & \cdots & \frac{\partial f_T}{\partial x_{rN}} & \frac{\partial f_T}{\partial a_1} & \cdots & \frac{\partial f_T}{\partial a_\aleph} & \frac{\partial f_T}{\partial \omega_1} & \cdots & \frac{\partial f_T}{\partial \omega_\aleph} & \frac{\partial f_T}{\partial \phi_1} & \cdots & \frac{\partial f_T}{\partial \phi_\aleph} \\ 0 & \frac{\partial f_R}{\partial x_2} & \frac{\partial f_R}{\partial x_{r1}} & \cdots & \frac{\partial f_R}{\partial x_{r1}} & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 & 0 & 0 \\ \vdots \\ 0 & 0 & 0 & 0 & 0 & 0 & 0 & 0 & 0 & 0 & 0 & 0 & 0 & 0 \end{bmatrix} \quad (64)$$

$$\frac{\partial f_T}{\partial x_1} = \frac{1}{m} \sum_j \sum_k A_{jk} \vec{n}_{jk} \hat{k} \left\{ \sum_n \left[ \rho g a_n \frac{\sinh(\chi_n(x_1 + z_{j,k} + h))\chi_n}{\cosh(\chi_n h)} \cos(\chi_n x_{j,k} - \omega_n t + \phi_n) \right] - \rho g \right\} \quad (65)$$

$$\frac{\partial f_T}{\partial x_2} = -\frac{1}{m} Bvisc \quad (66)$$

$$\frac{\partial f_T}{\partial \vec{x}_r} = -\frac{1}{m} C_r^T \quad (67)$$

$$\frac{\partial f_T}{\partial a_n} = \frac{1}{m} \sum_j \sum_k A_{jk} \vec{n}_{jk} \hat{k} \rho g \frac{\cosh(\chi_n(x_1 + z_{j,k} + h))}{\cosh(\chi_n h)} \times \cos(\chi_n x_{j,k} - \omega_n t + \phi_n) \quad (68)$$

$$\forall n = 1 \ldots \aleph$$

$$\frac{\partial f_T}{\partial \omega_n} = \frac{1}{m} \sum_j \sum_k t A_{jk} \vec{n}_{jk} \hat{k} \rho g a_n \frac{\cosh(\chi_n(x_1 + z_{j,k} + h))}{\cosh(\chi_n h)} \times \sin(\chi_n x_{j,k} - \omega_n t + \phi_n) \quad (69)$$

$$\forall n = 1 \ldots \aleph$$

$$\frac{\partial f_T}{\partial \phi_n} = -\frac{1}{m} \sum_j \sum_k A_{jk} \vec{n}_{jk} \hat{k} \rho g a_n \frac{\cosh(\chi_n(x_1 + z_{j,k} + h))}{\cosh(\chi_n h)} \times \sin(\chi_n x_{j,k} - \omega_n t + \phi_n) \quad (70)$$

$$\forall n = 1 \ldots \aleph$$

The Jacobian matrix, H, of the output equations is evaluated as follows:

$$H(j, i) = \frac{\partial h_j}{\partial \vec{X}(i)} \quad (71)$$

where for j=1:

$$\frac{\partial h_1}{\partial \vec{X}(1)} = 1, \frac{\partial h_1}{\partial \vec{X}(\ell)} = 0, \forall \ell = 2, \ldots, N+1 \quad (72)$$

For j=2, 3, . . . , N+1, the following gradient functions can be written for each frequency $\omega_n$, $n \in \{1, \ldots, \aleph\}$:

$$\frac{\partial h_j}{\partial a_n} = \rho g \frac{\cosh(\chi_n(x_1 + z_{j,k} + h))}{\cosh(\chi_n h)} \cos(-\omega_n t + \phi_n) \quad (73)$$

$$\frac{\partial h_j}{\partial \omega_n} = \rho g a_n \frac{\cosh(\chi_n(x_1 + z_{j,k} + h))}{\cosh(\chi_n h)} t \sin(-\omega_n t + \phi_n) \quad (74)$$

$$\frac{\partial h_j}{\partial \phi_n} = -\rho g a_n \frac{\cosh(\chi_n(x_1 + z_{j,k} + h))}{\cosh(\chi_n h)} \sin(-\omega_n t + \phi_n) \quad (75)$$

For j=2, 3, . . . , N+1, the gradient functions with respect to the heave position are:

$$\frac{\partial h_j}{\partial x_1} = \sum_n \rho g a_n \frac{\sinh(\chi_n(x_1 + z_{j,k} + h))\chi_n}{\cosh(\chi_n h)} \cos(-\omega_n t + \phi_n) - \rho g \quad (76)$$

$$\frac{\partial h_j}{\partial x_2} = -Bvisc/A \quad (77)$$

$$\frac{\partial h_j}{\partial x_r} = -Cr/A_t \quad (78)$$

The WEC system under consideration is a continuous system while the measurements are collected at discrete points. Hence, a continuous-discrete extended Kalman filter can be implemented, See J. L. Crassidis and J. L. Junkins, *Optimal estimation of dynamic systems*, Boca Raton, Fla.: Chapman & Hall/CRC (2004). Associated with the estimated state vector $\hat{X}(t)$ is the matrix P(t), which is the covariance of the state error vector. The covariance matrix propagates in time according to the Riccati equation:

$$\dot{P}(t) = F(\hat{X}(t), t)P(t) + P(t)F^T(\hat{X}(t), t) + Q(t) \quad (79)$$

where Q is the covariance matrix associated with the process noises vector $\vec{\omega}(t)$.

The process of the continuous-discrete EKF implemented on the WEC system is:

(1) Propagate the current state using Eqs. (50)-(54) to the next measurement time r; the resulting state is $\vec{X}_\tau^-$ (2) Propagate the covariance matrix to the next measurement time τ using the Riccati Eq. (79). The resulting covariance is $P_\tau^-$ (3) At time τ, evaluate the output Jacobian matrix $H_\tau$, also evaluate the measurements' noises covariance matrix $R_\tau$ (4) Compute the Kalman gain using Eq. (80).

(5) Update the state $\vec{X}_\tau^-$ using $\hat{X}_\tau^+ = \hat{X}_\tau^- + \Gamma_\tau[\tilde{y}_\tau - \vec{y}(\hat{X}_\tau^-)]$ (6) Update the covariance $P_\tau^-$ using $P_\tau^+ = [I - \Gamma_\tau H_\tau(\hat{X}_\tau^-)]P_\tau^-$ (7) The current state is $\vec{X}_\tau^+$ and the current covariance is $P_\tau^+$. Go to step 1.

$$\Gamma_\tau = P_\tau^- H_\tau^T(\hat{X}_\tau^-)[H_\tau(\hat{X}_\tau^-)P_\tau^- H_\tau^T(\hat{X}_\tau^-) + R_\tau]^{-1} \quad (80)$$

The pressure and heave position measurements, at each time, are collected in the vector $\tilde{y}_\tau$. This vector is used to update the estimated state vector $\hat{X}$, as described above. The estimated state vector $\hat{X}$ includes the estimates of the wave amplitudes, frequencies, and phases, at the current time. Using the estimated state vector, $\hat{X}$, an estimate for the excitation force $\hat{f}_e$ can be computed using Eq. (55), where the states $x_1$, $\omega_n$, $\phi_n$, and $a_n$ are replaced by their estimates.

The EKF needs to be initialized with initial guesses for the state vector and the covariance, $\hat{X}(0)$ and $P_0$, respectively. This EKF generates an estimate for the state vector $\hat{X}$ at each time step τ. This EKF is a sequential algorithm which means that at each time step the optimal estimation is computed as a function only of the measurement at the current time and the estimated state at the previous time, as can be seen from the EKF steps listed above. This is computationally very efficient compared to other batch estimators.

The velocity is not being measured in the problem setup described herein. Preliminary simulation results show that the estimated excitation force converges to the true excitation force with reasonable accuracy after a transient period. In this transient period, the estimates of the amplitudes, frequencies, and phases deviate away before they converge to their true signals. Aiming at eliminating this deviation in the transient period and to improve the estimation accuracy, a pseudo measurement can be added. That is, the velocity can be computed by taking the derivative of the position, capitalizing on the available very accurate position sensor; yet the computed velocity can be included in the model as if it was an actual measurement. This pseudo measurement is appended to the measurements vector and is handled similar to other measurements. The new output model is $$\vec{y} \equiv [x_1, x_2, p_1, p_2, \ldots, p_N]^T \quad (81)$$
$$= [h_1(\vec{X}), h_2(\vec{X}), \ldots h_{N+2}(\vec{X})]^T$$

Singular Arc Control

There are several control strategies that can be implemented on WECs, as described above. The harvested energy over a time interval [0 T] can be computed as $$E = \int_0^T \{u(t)\dot{x}(t)\}dt \quad (82)$$

The optimal control maximizes the harvested energy in Eq. (82) (which is the same as Eq. (5)). Singular arc control is a closed form analytic solution for the control force in terms of the excitation force, in the Laplace domain. The roots of singular arc control were developed by Kasturi and Duponts for vibration dampers. See P. Kasturi and P. Duponts, *Sound and Vibration* 215(3), 499 (1998). The control is adopted for the VVEC system defined in Eq. (46), after converting the system to its equivalent state-space model, with radiation states added to model the radiation force. The singular arc control is derived using the principals of optimal control theory, where the necessary conditions of optimality are derived. These necessary equations of optimality for the WEC problem are a set of differential equations in the states, the co-states, and the control. These differential equations are transformed to the Laplace domain to solve for the control. The mathematical detail as well as several numerical test cases in which the excitation force is assumed known perfectly was described above. Below, the excitation force is estimated in order to examine the performance of this control when using the estimated excitation force in computing the control.

If the maximum control force is γ, then it can be shown that the singular arc control for the VVEC system defined in Eq. (46) is $$u = \begin{cases} u_{sa}, & C = 0; \\ \gamma, & C > 0; \\ -\gamma, & C < 0; \end{cases} \quad (83)$$

(Eq. (83) is the same as Eq. (23)). The $u_{sa}$ is a singular arc control; C is a switching function that is equal to the derivative of the Hamiltonian with respect to the control. An easy way to compute the switching points in Eq. (83) is to compute the $u_{sa}$ term as detailed below, and then compare its value to the control boundaries±γ. If its value is outside the boundaries, then it gets replaced by the nearest boundary value.

The singular arc term $u_{sa}$ in the Laplace (s) domain, $U_{sa}(s)$, is of the form $U_{sa}(s) = U_1(s) + U_2(s)$, where $$U_1(s) = \frac{N_1(s)}{D_1(s)} \quad (84)$$

$$N_1(s) = (ms^2 + (C_r(sI + A_r)^{-1}B_r - B_v)s + k)F_e(s) \quad (85)$$

$$D_1(s) = s(C_r(sI + A_r)^{-1}B_r - C_r(sI - A_r)^{-1}B_r - 2B_v) \quad (86)$$

$$U_2(s) = \frac{N_2(s)}{D_2(s)} \quad (87)$$

$$N_2(s) = \quad (88)$$
$$\left(\left(\lambda_{20} + \vec{\lambda}_{r0}(sI + A_r)^{-1}B_r\right)s - \lambda_{10}\right)(ms^2 + (C_r(sI - A_r)^{-1}B_r + B_v)s + k)$$

$$D_2(s) = s^2(C_r(sI + A_r)^{-1}B_r - C_r(sI - A_r)^{-1}B_r - 2B_v) \quad (89)$$

(Eqs. (84)-(89) are the same as Eqs. (35)-(40)). The $A_r$, $B_r$, $C_r$ are the matrices of the radiation state-space model defined in Eqs, (58) and (60), $F_e$ is the excitation force, I is the identity matrix, and $\lambda_i$ are co-states. The $U_2(s)$ is a transient term that depends only on the initial values of the co-states and is independent from the excitation force. The $U_1(s)$ is the steady-state term that depends on the excitation force. If only the steady-state solution is of interest, then $U_2(s)$ can be dropped, which means that it is not necessary to solve for the co-states. The steady-state control $U_1(s)$ is a function of the excitation force only. The estimated excitation force can be used in Eq. (84) to solve for the control. The control $U_1(s)$ has more zeros than poles (the order of the numerator is higher than the order of the denominator). This control then needs to evaluate the derivative of the excitation force. This is consistent with the notion that wave prediction in the future is usually needed to compute the optimal control, since the derivatives at a current time carry the information needed for prediction in the future. See D. Mugler and W. Splettstosser, *IEEE Transactions on Information Theory* 33(3), 360 (1987), The singular arc control then replaces the wave prediction step by computing the derivatives of the excitation force at the current time.

The estimated excitation force can be computed in the Laplace domain as follows. The equation for excitation force in time domain is expressed as $$F_e(t) = \sum_{n=1}^{\aleph} \mathcal{R}(C_{Fe,n} a_n e^{i(-\omega_n t + \phi_n)}) \tag{90}$$

where $\mathbb{R}(x)$ is the real part of x, $C_{Fe,n} = A_n + tB_n$ is the excitation force coefficient which is a complex number, Hence, $$F_e(t) = \sum_{n=1}^{\aleph} A_n \cos(-\omega_n t + \phi_n) - B_n \sin(-\omega_n t + \phi_n) \tag{91}$$

$$= \sum_{n=1}^{\aleph} A_n \cos(\omega_n t - \phi_n) + B_n \sin(\omega_n t - \phi_n)$$

$$= \sum_{n=1}^{\aleph} A_n(\cos(\phi_n)\cos(\omega_n t) + \sin(\phi_n)\sin(\omega_n t)) +$$

$$\sum_{n=1}^{\aleph} B_n(\cos(\phi_n)\sin(\omega_n t) - \sin(\phi_n)\cos(\omega_n t))$$

The Laplace transform of Eq. (91) is $$F_e(s) = \sum_{n=1}^{\aleph} A_n \left( \cos(\phi_n) \frac{s}{s^2 + \omega_n^2} + \sin(\phi_n) \frac{\omega_n}{s^2 + \omega_n^2} \right) + \tag{92}$$

$$\sum_{n=1}^{\aleph} B_n \left( \cos(\phi_n) \frac{\omega_n}{s^2 + \omega_n^2} - \sin(\phi_n) \frac{s}{s^2 + \omega_n^2} \right)$$

The excitation force coefficients $A_n$ and $B_n$ can be evaluated numerically for a given buoy shape. They can also be estimated using the estimated excitation force in Eq. (55) along with the estimated wave amplitudes, frequencies, and phases. Estimating the excitation force coefficients can be carried out by adding these coefficients as additional states in the EKF, or simply by solving a least square error problem. Expressing the excitation force in the Laplace domain, Eq. (92) enables the calculation of the derivatives of the excitation force, which is needed by the singular arc control.

Simulation Results

Figure 15:
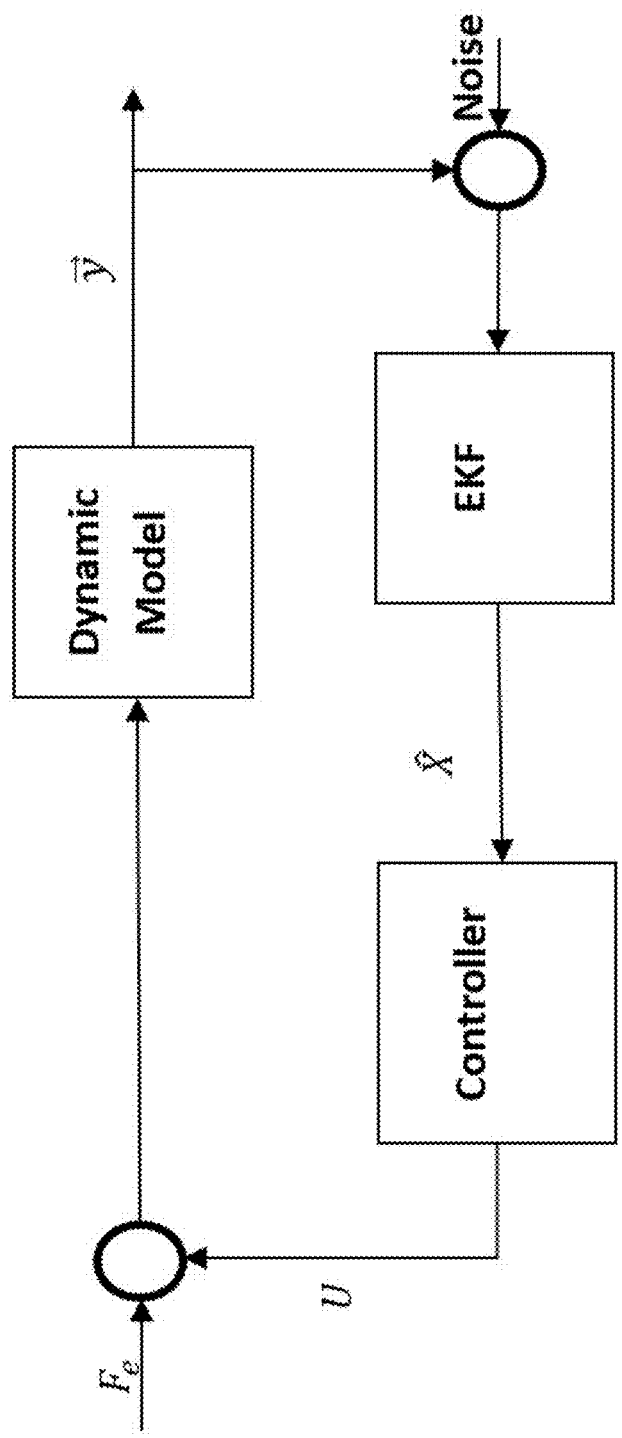
FIG. 15 is a high-level block diagram of the simulation tool.
Figure 16:
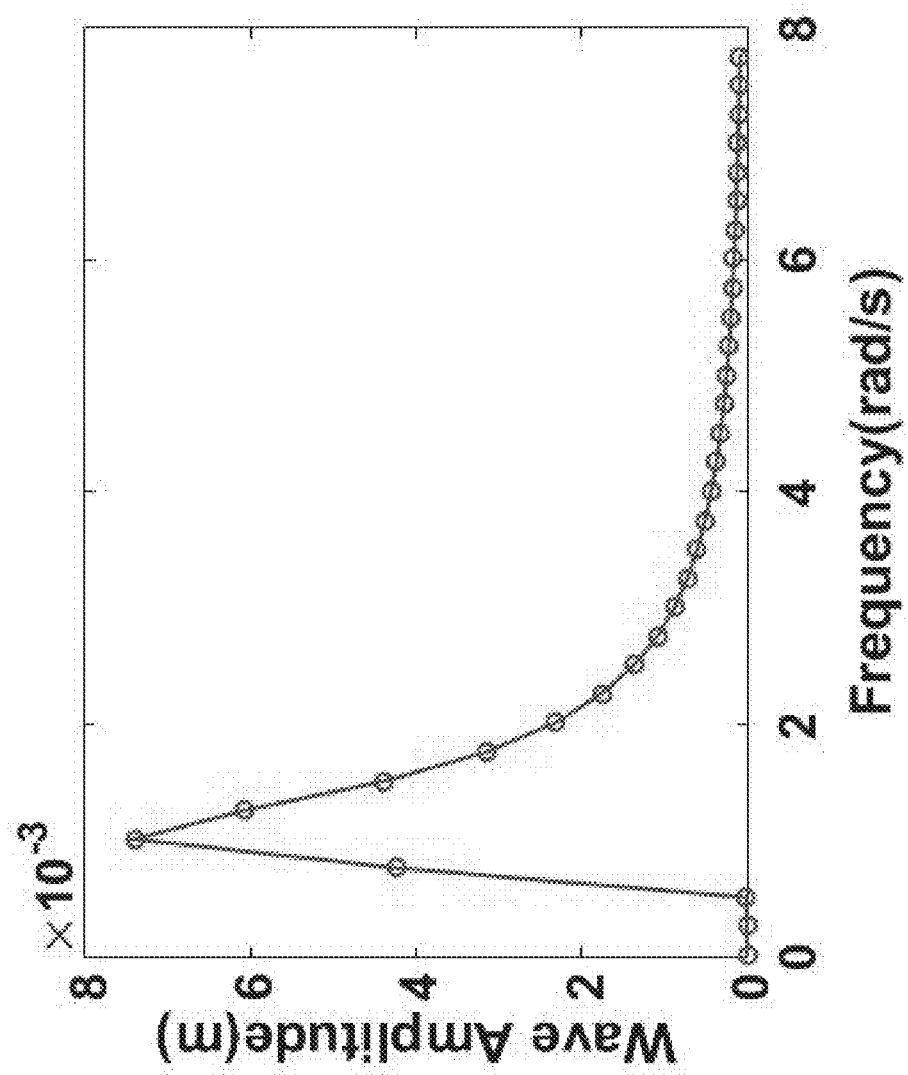
FIG. 16 is a graph of wave elevation versus frequency.

A simulation tool was developed to test the excitation force estimation and control system. FIG. 15 shows the block diagram of this simulation tool. A dynamic model that propagates the system's state vector in time is developed and is labeled 'dynamic model' in FIG. 15. This dynamic model simulates the true model and assumes 32 frequencies in a Bretschneider wave ($\aleph = 32$), as shown in FIG. 16. To propagate the true model, process noises are added to the right-hand side of Eqs. (50)(54) to account for any non-modelled effects, such as nonlinear viscous effects. The process noises are assumed random with a normal distribution, the statistical properties of which are listed in Table 1; zero mean noise is assumed for all the states. To create the measurements vector $\tilde{y}$,

TABLE 1

Statistical characteristics of the process noise.

| State | Standard deviation |
| --- | --- |
| Position ($x_1$) | 1 |
| Velocity ($x_2$) | 8 |
| Radiation states ($\bar{x}_r$) | 0.1 |
| Frequency ($\omega_i$) | 0.01 |
| Phase ($\phi_i$) | 0.01 |
| Amplitude ($a_i$) | 0.01 |

TABLE 2

Statistical characteristics of the measurement noise.

| Measurement | Standard deviation |
| --- | --- |
| Pressure $\tilde{p}_i$ | 1000 |
| Position $\tilde{x}_1$ | 0.01 |
| Velocity pseudo measurement $\tilde{x}_2$ | 0.5 | a noise is added to each element in the output vector ($\vec{y}$) of the dynamic model. The noise of each measurement is assumed to be random with normal distribution; a zero mean noise is assumed for each output and the standard deviation values are listed in Table 2. The EKF block in FIG. 15 has the EKF propagation and update equations. The EKF uses a dynamic model for propagation; this dynamic model is Eqs. (50)-(54) assuming only 10 frequencies in the wave and the excitation force ($\aleph = 10$), as opposed to 32 in the dynamic model that simulates the true model. Finally, the 'Controller' block computes the singular arc control using the estimated state vector $\hat{X}$.

Two case studies are considered as examples. The first case assumes a buoy, with no control force applied, moving only due to the wave effect. The purpose of this case study is to verify the EKF is working and to compare the results of the EKF with results obtained from numerical simulations. The second case study implements the singular-arc control method of the present invention, along with the estimated excitation forces from the EKF.

Figure 17:
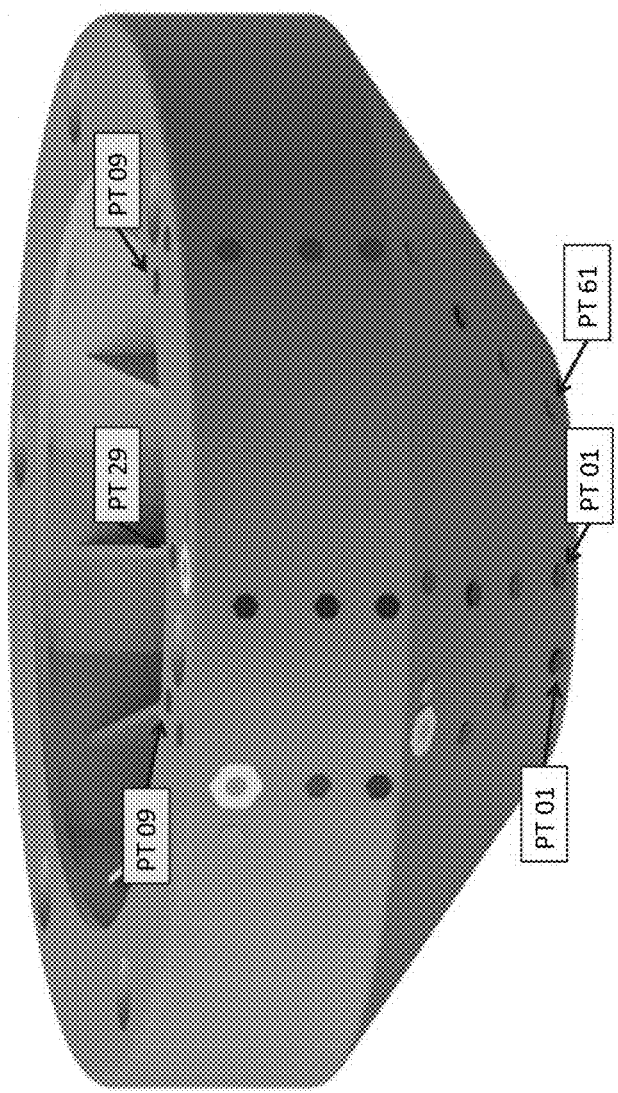
FIG. 17 is a schematic illustration of an experimental WEC with locations of pressure transducers.

The test cases considered an experimental buoy configuration. The experimental device, shown in FIG. 17, has a mass of 858.4 kg, a volume of 0.8578 m³, and a diagonal inertia matrix of [83.9320, 83.9320, 137.5252] kg m². It is assumed in the simulations that there are eight pressure sensors on one quadrant of the buoy surface at different heights.

Case 1: Buoy with No Control

Figure 18:
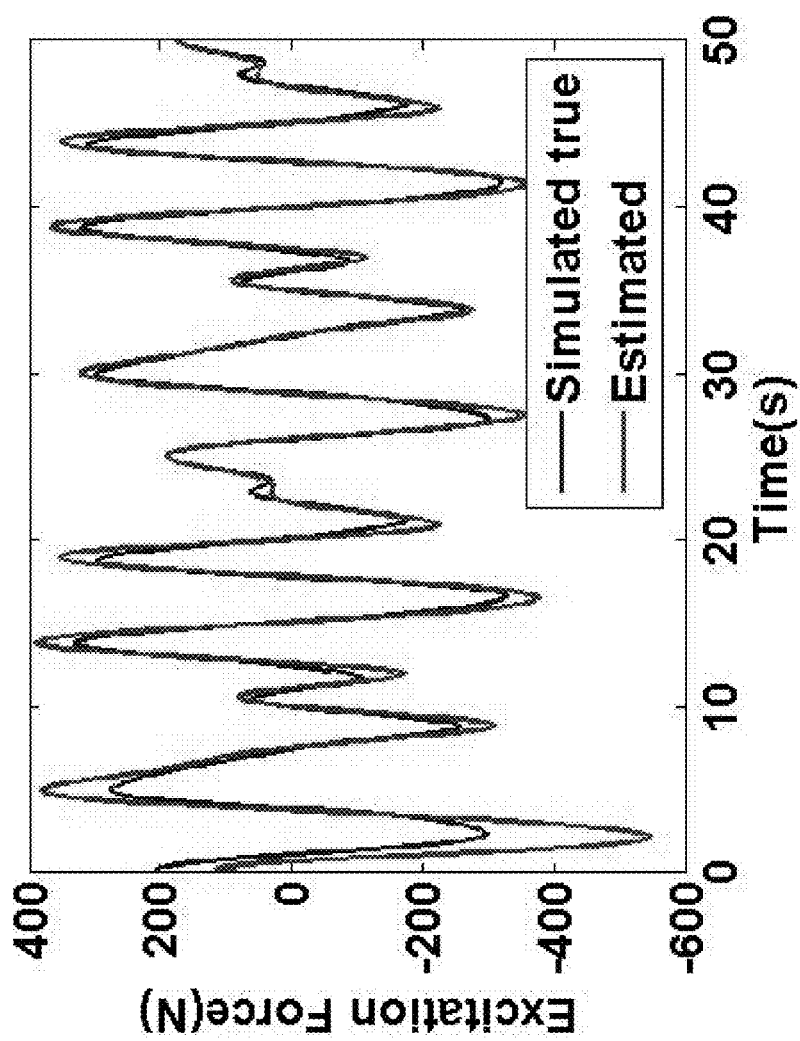
FIG. 18 is a graph of the estimated excitation force.
Figure 19:
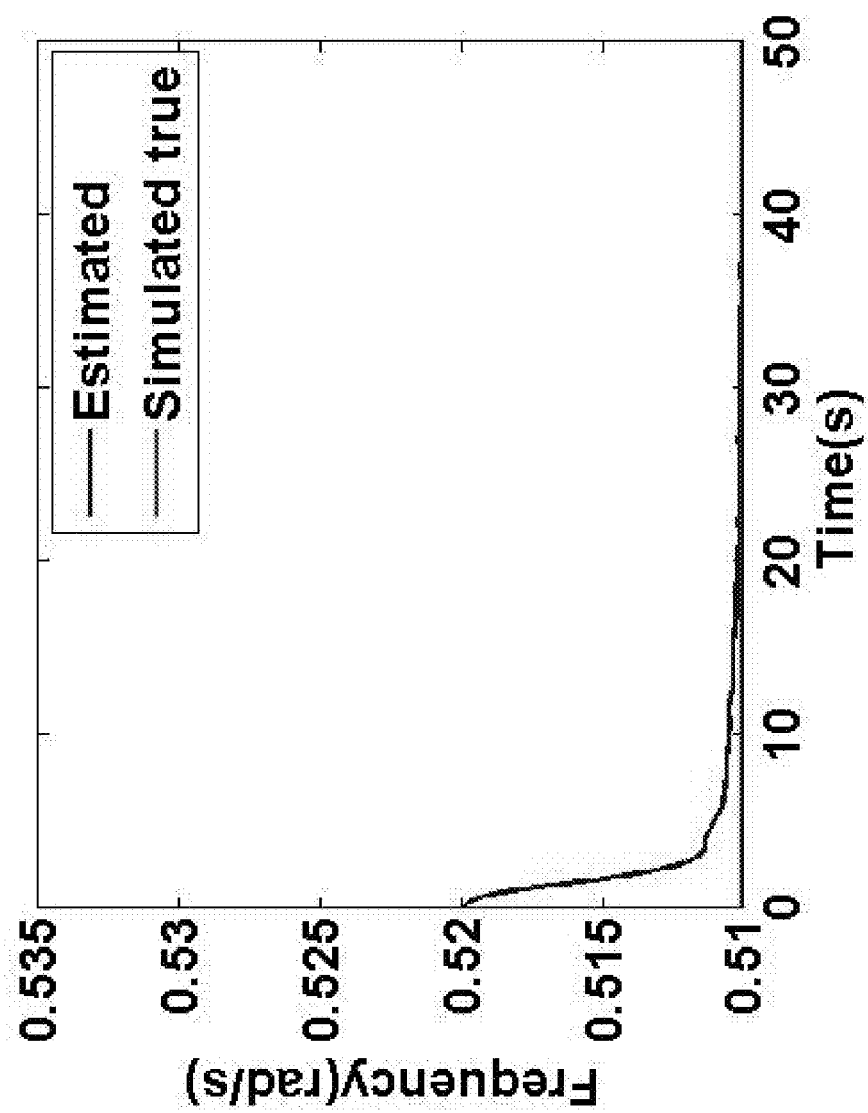
FIG. 19 is a graph of the estimated frequency vs. true frequency.
Figure 20:
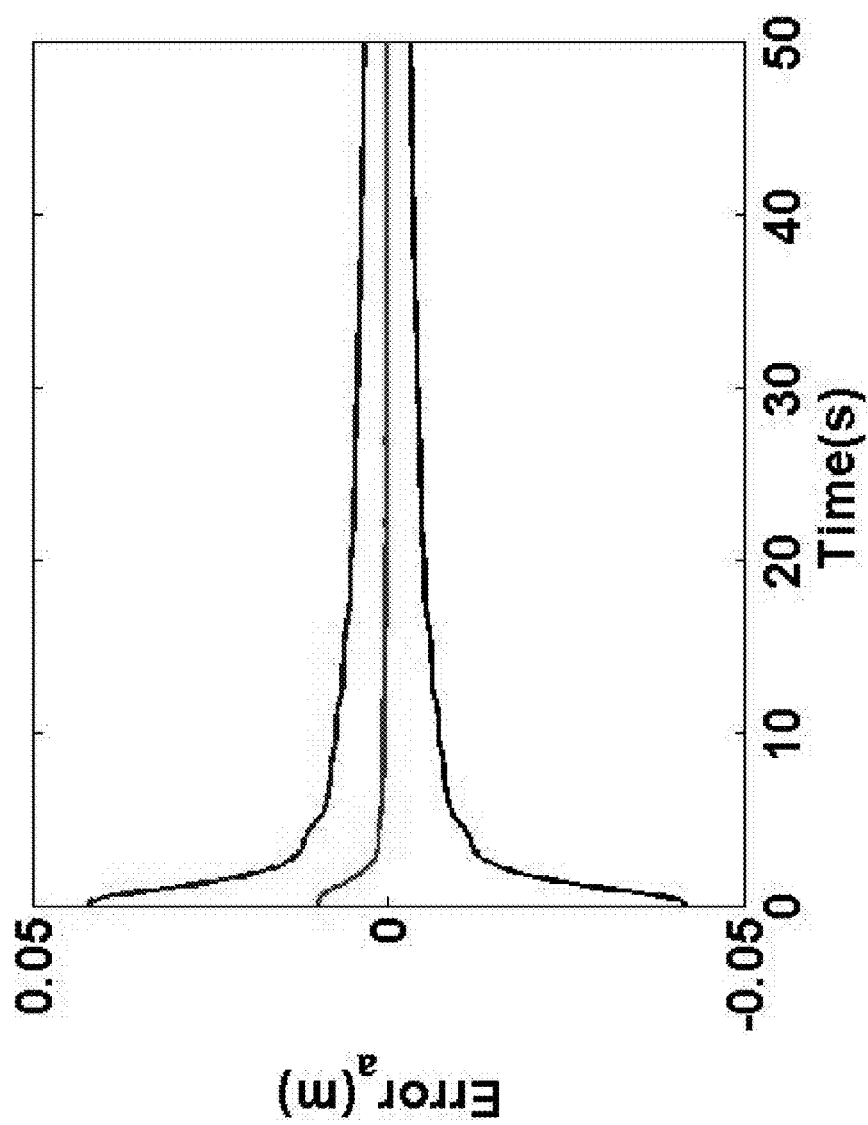
FIG. 20 is a graph of error and error boundaries of one estimated frequency amplitude.

In this case, it is assumed that there is no control force applied on the buoy. FIG. 18 shows the estimated excitation force as a function of time compared to the simulated true excitation force. The estimated excitation force is very close to the true excitation force. The accuracy of the estimated state vector is also very accurate. For example, FIG. 19 shows the estimate of one of the frequencies versus its true value, where the initial state error is assumed to be 0.01 rad/s. The error in estimating the wave amplitude at that frequency is shown in FIG. 20. An initial error is assumed to be 0.007 m.

Figure 21:
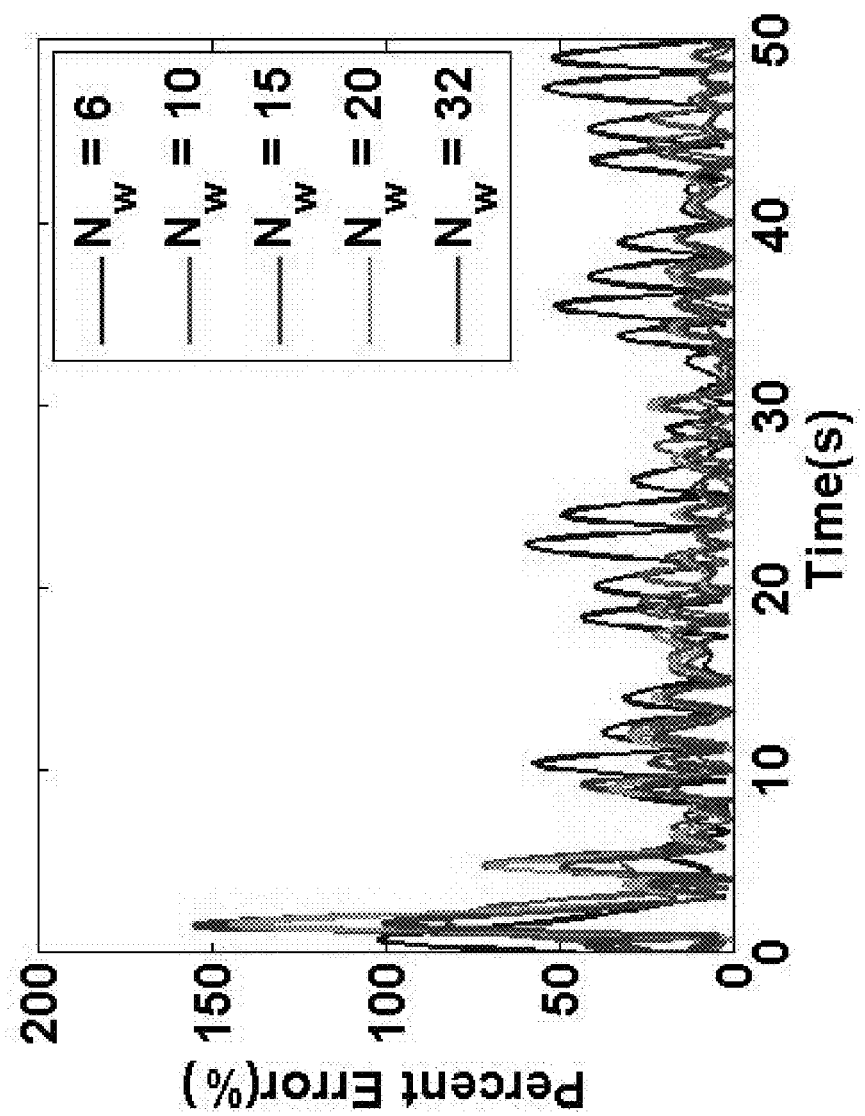
FIG. 21 is a graph of the error percentage in estimating the excitation force for different values of modelled frequencies in the EKF.

The above results can be further improved if the number of estimated frequencies in the EKF is increased. FIG. 21 shows the percentage error in estimating the excitation force over time for various values of $N_\omega$, which is the number of frequencies modelled in the EKF; note that the number of frequencies in the simulated true model is assumed 32.

Case 2: Buoy with Singular Arc Control

Figure 22:
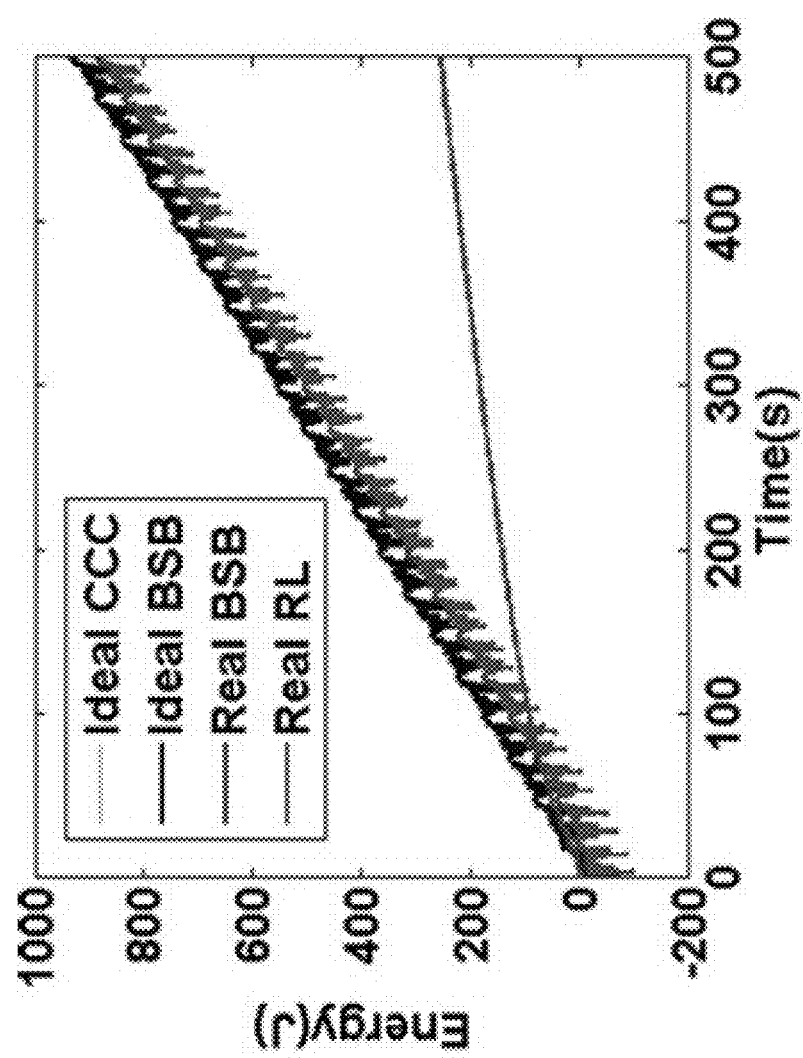
FIG. 22 is a graph of the extracted energy using BSB control and EKF.

In this case, an actuator is assumed to control the buoy. The control logic is based on the bang-singular-bang (BSB) control, as described above. This BSB controller requires also the estimation of the excitation force at the current time. The excitation force is estimated in the EKF as shown in FIG. 15. FIG. 22 shows the energy absorbed using a complex conjugate control assuming perfect knowledge of the excitation force (ideal CCC), the energy absorbed using a BSB control assuming perfect knowledge of the excitation force (ideal BSB), and the energy absorbed using BSB control assuming noisy measurements and using the EKF to estimate the excitation force (Real BSB). The energy harvested using the baseline resistive loading control based on the estimated buoy states (Real RL) is also shown in FIG. 22. The energy of the ideal CCC matches that of the ideal BSB, which highlights the effectiveness of the BSB control. As expected, the real BSB produces lower energy harvesting due to the presence of measurements noises and model uncertainties, which result in errors in estimating the excitation force. Yet, the energy harvested using the real BSB is high compared to the energy harvested using the real RL control.

Figure 23:
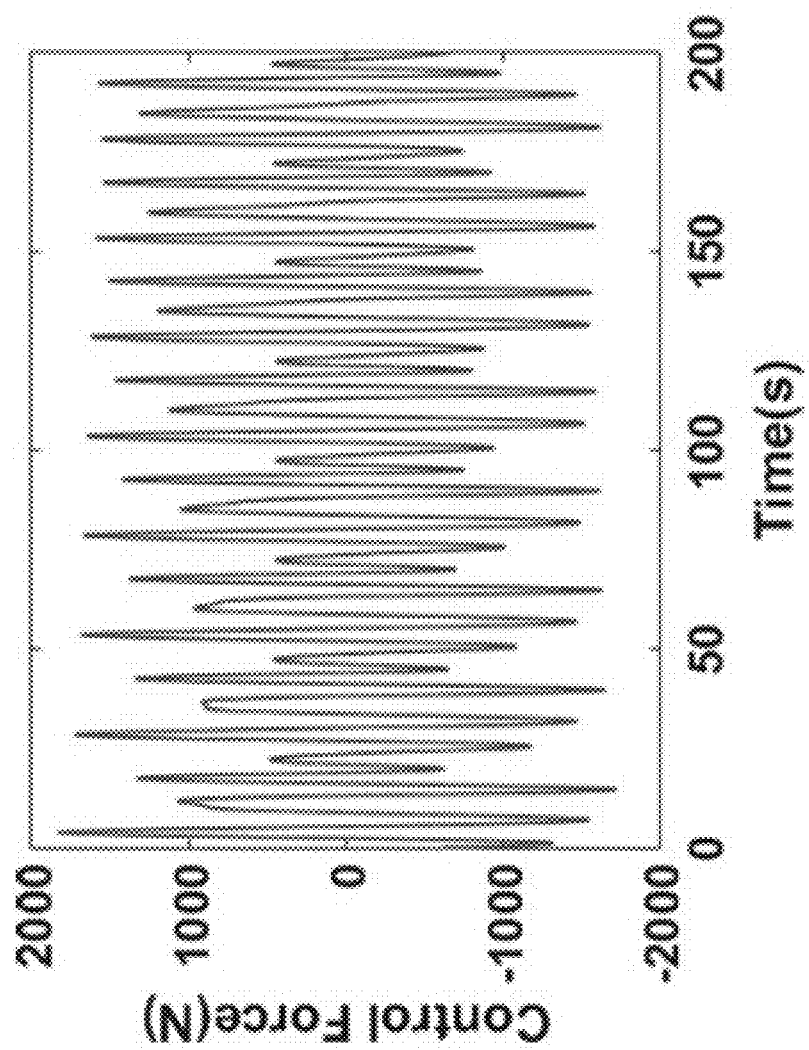
FIG. 23 is a graph of the actuator control force using BSB control and EKF
Figure 24:
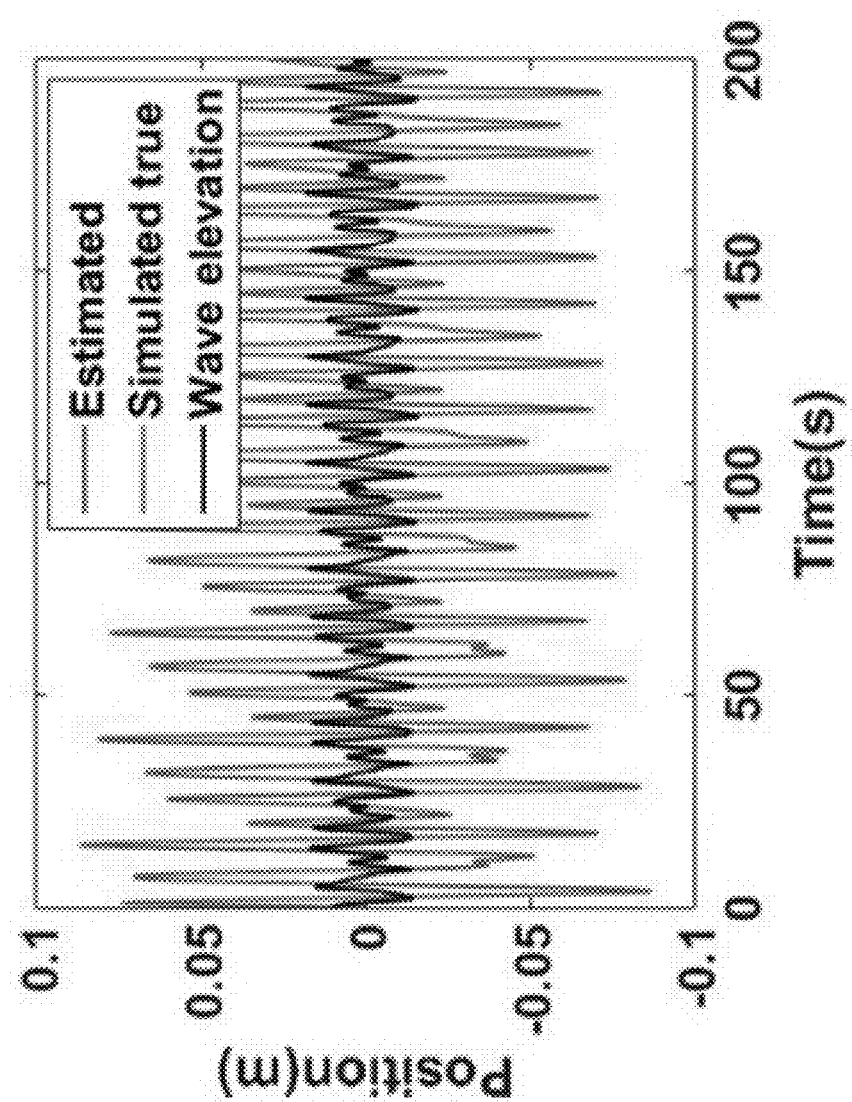
FIG. 24 is a graph of the buoy position using BSB control and EKF.
Figure 25:
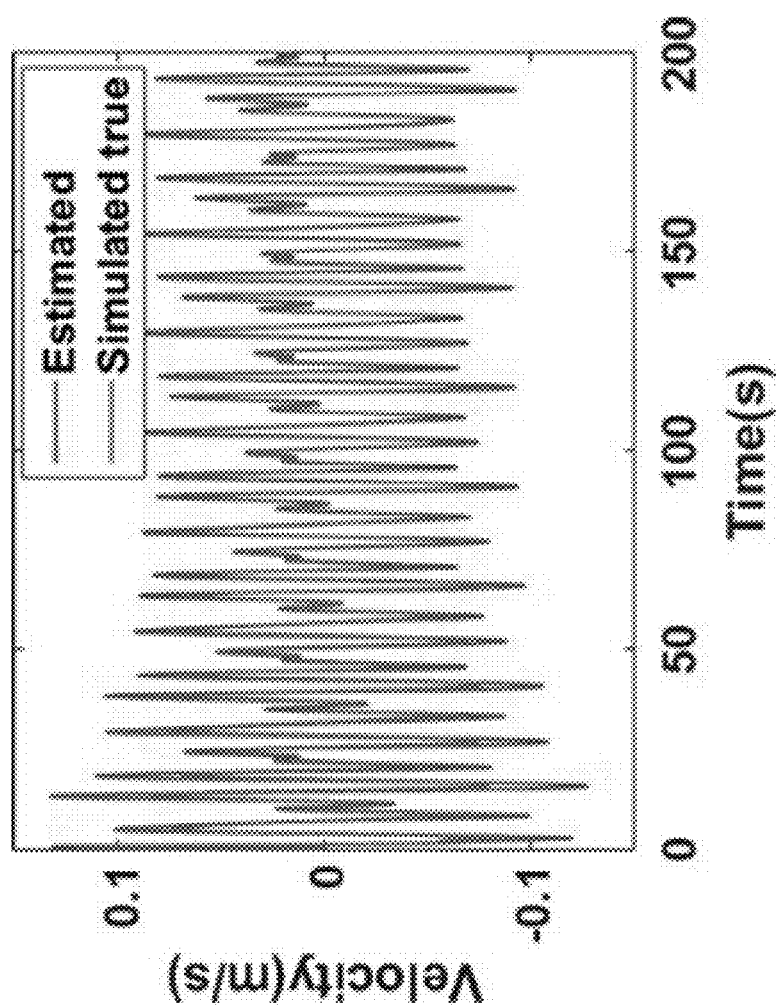
FIG. 25 is a graph of the error in the buoy estimated velocity.

The corresponding applied control force is shown in FIG. 23. The history of the buoy position over time is shown in FIG. 24, where both the true position of the buoy and estimated position of the buoy from the EKF are shown, along with the wave elevation. FIG. 24 also shows that the buoy does not leave the water in this simulation. The estimated position matches the true one. The true buoy velocity and the estimated buoy velocity are shown in FIG. 25. The error in velocity estimation is very small and is within the 3σ boundaries all the time.

Figure 26:
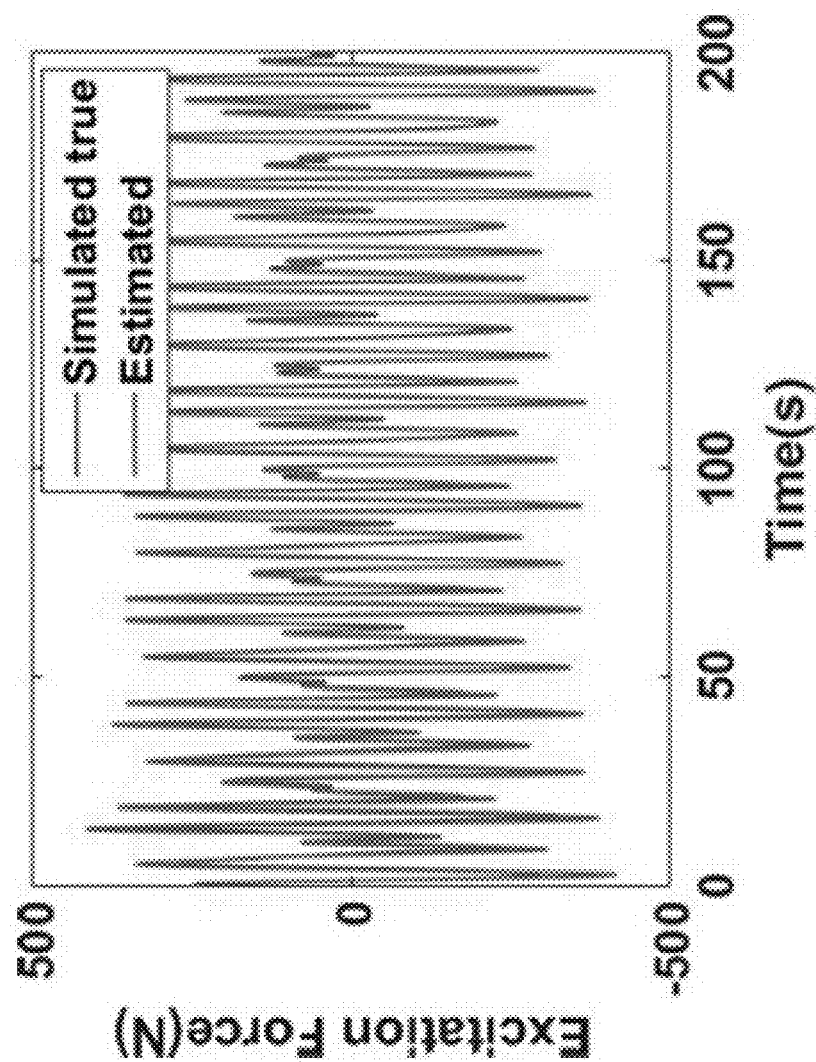
FIG. 26 is a graph of the estimated and simulated true excitation force.
Figure 27:
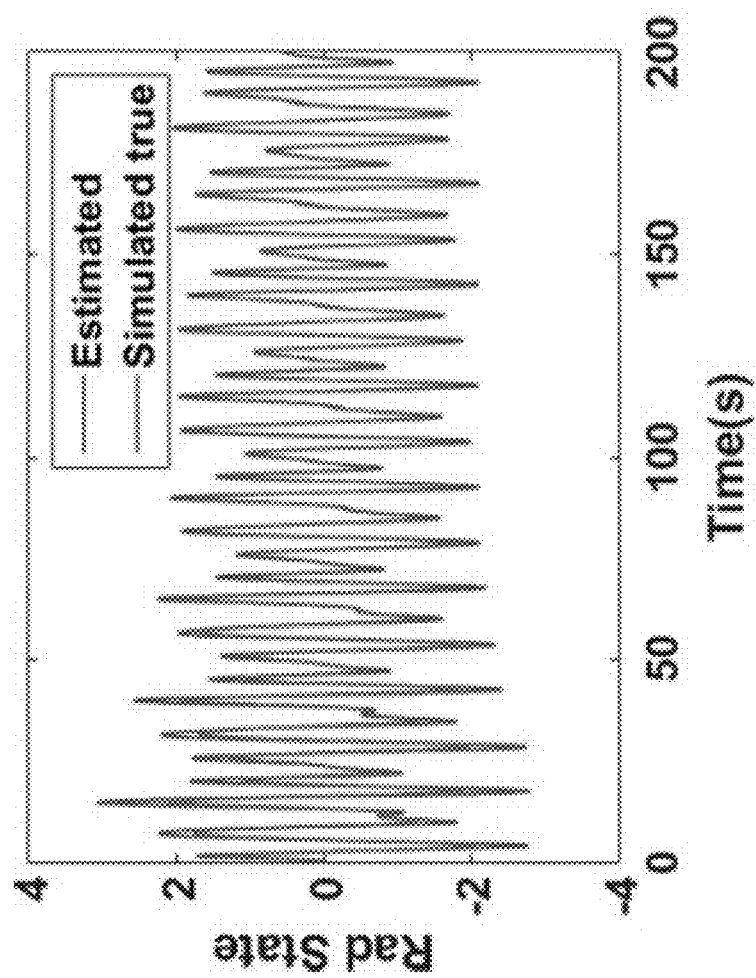
FIG. 27 is a graph of the estimated and simulated true histories for one radiation state.
Figure 28:
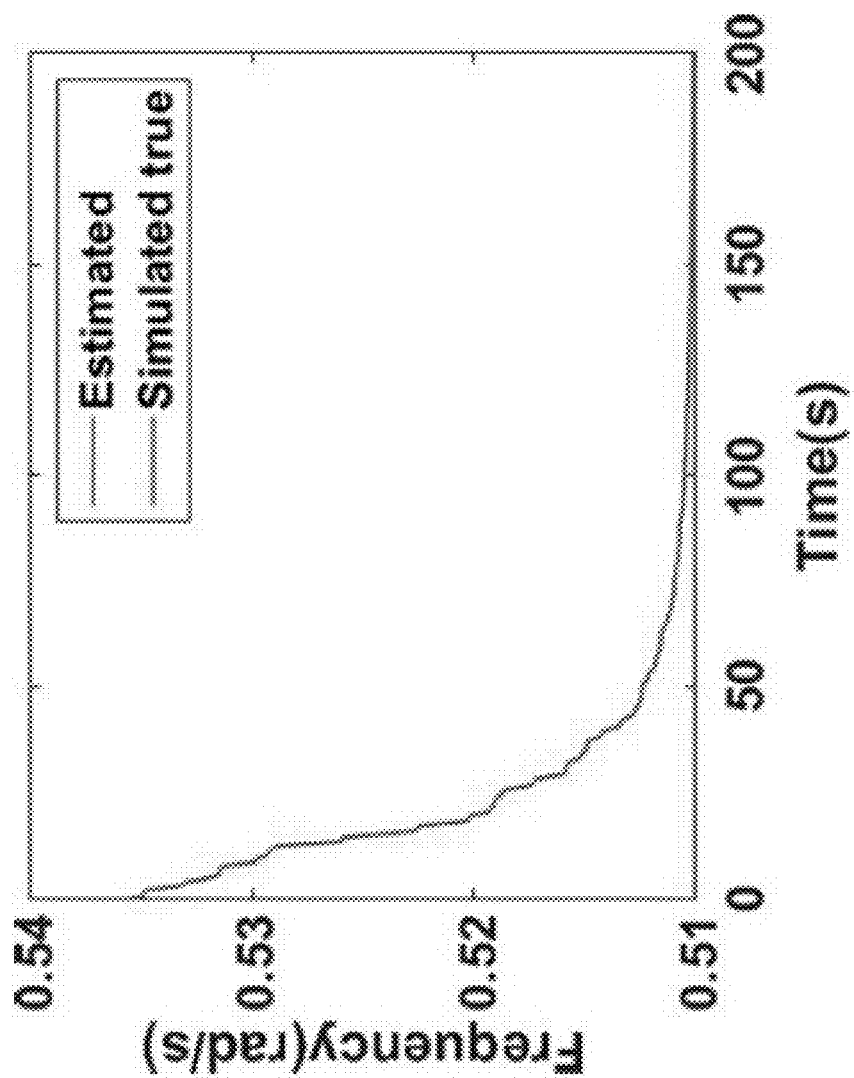
FIG. 28 is a graph of the estimated frequency along with its true value.
Figure 29:
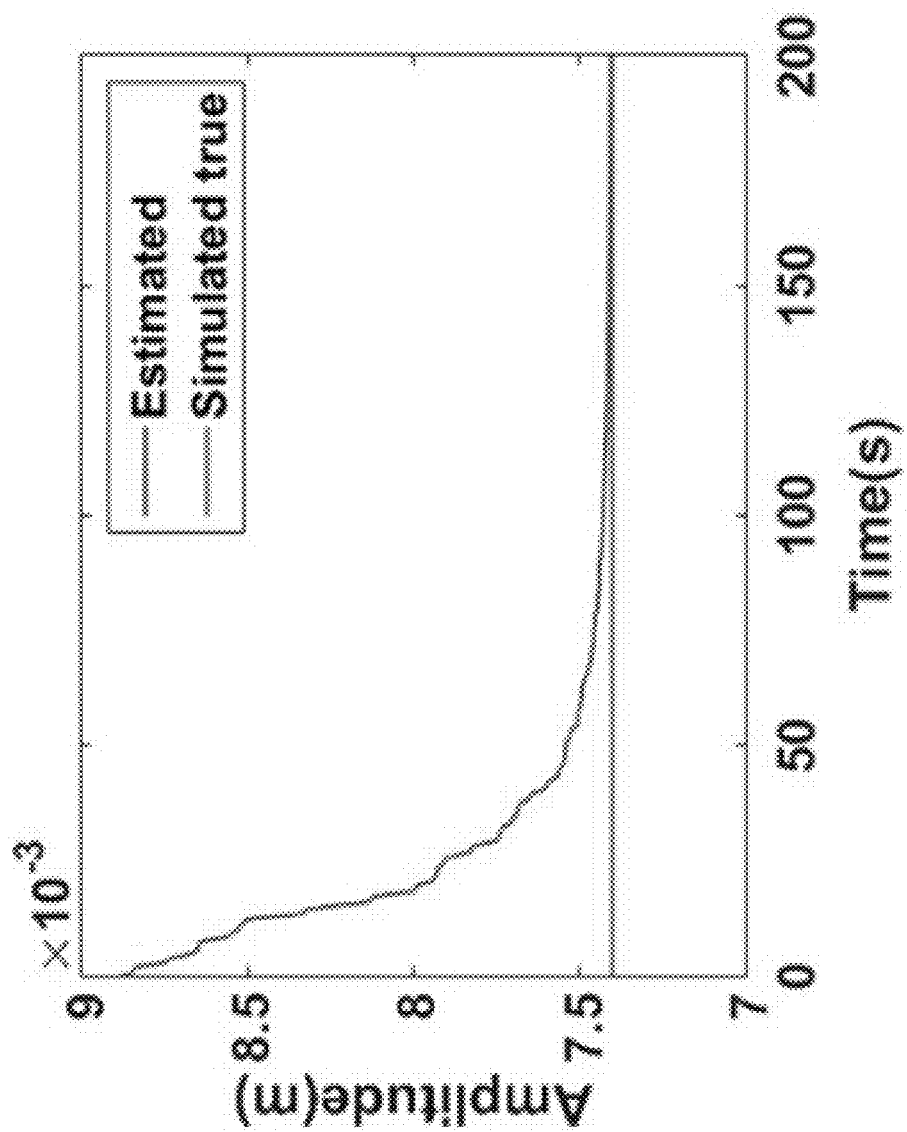
FIG. 29 is a graph of one estimated wave amplitude along with estimation error boundaries.

FIG. 26 shows the estimated excitation force along with the simulated true excitation force in this case. FIG. 27 shows the estimation accuracy for one radiation state; the rest of the radiation states are also accurately estimated. One estimated frequency is shown in FIG. 28. The error in estimating one wave amplitude is shown in FIG. 29 along with the 3σ error boundaries.

The excitation force estimation described above uses an EKF. There are several publications that address the problem of wave (or excitation force) estimation and prediction; and some of them have implemented EKF. The EKF implementation, however, varies among these studies. For example, Fusco and Ringwood have implemented the EKF for wave prediction, but their study focused on the single frequency case. See F. Fusco and J. V. Ringwood, *IEEE Transactions on Sustainable Energy* 1(2), 99 (2010). The measurements used in Fusco and Ringwood are the free surface wave elevation measurements. Ling and Batten, on the other hand, used the EKF to estimate the excitation force on the buoy where the measurements are assumed to be the buoy motion (heave position and velocity). See B. A. Ling and B. A. Batten, "Real time estimation and prediction of wave excitation forces on a heaving body," in *ASME* 2015 *34th international conference on ocean, offshore and arctic engineering* (Vol. 9), Ocean renewable energy, ASME: St. John's, Newfoundland (2015). In Ling and Batten, the excitation force is modelled as the summation of three modes at three different frequencies. Hence, the state vector included the three frequencies, amplitudes, and phases. In both Fusco and Ringwood and Ling and Batten, the frequency model allows a change in the frequency value over time through the process noise term that is added to the WEC model. One way to understand how the EKF works is as follows. The EKF collects measurements $\tilde{y}$, and it also has a mathematical model that describes how the states evolve over time, f. The mathematical model alone can provide an estimate for the states at any time; this estimate, however, when used to compute the output (pressures and motion) may not yield the measured values. The EKF searches for the optimal estimate of the states $\hat{X}$ that is a weighted satisfaction for both the measured values and the estimates based on the mathematical model. The weights depend on the levels of measurements noises versus the process noises. Hence, there are two elements that are crucial for an efficient use of the EKF: the mathematical model and the measurements. The more representative is the mathematical model and the more accurate are the measurements, the more accurate is the estimated state vector.

As descried above, the EKF mathematical model includes the WEC equation of motion; and hence it includes models for the radiation force, the excitation force, and the mathematical relation between the measurements and the estimated quantity. This implementation of the EKF is then expected to have good accuracy, as evident from the numerical results. It is noted here that while the inclusion of this mathematical model may increase the estimation computational cost compared to the other implementations in Fusco and Ringwood and Ling and Batten, the prediction step is eliminated in this method while both of the EKF implementations in Fusco and Ringwood and Ling and Batten carry out a prediction step after the estimation step. As described in this EKF implementation, the measurements are more direct to the buoy motion and to the estimation states, similar to the implementation in Ling and Batten, but unlike the implementation in Fusco and Ringwood. Also, this EKF implementation assumes ℵ frequencies in the EKF model, where ℵ is a parameter that can be varied. Usually, the higher the value of ℵ, the higher is the computational cost, but the estimation is more accurate, up to a limit.

The present invention has been described as optimal control of wave energy converters. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for extracting energy from water waves, comprising:
   providing a wave energy converter comprising a buoy in water having heave wave motion;
   estimating an excitation force of the heave wave motion on the buoy;
   computing a control force from the estimated excitation force using a dynamic model, wherein the model comprises
      constructing a Hamiltonian as a function of buoy states, wherein the Hamiltonian is a linear function of the control force and wherein the control force comprises a singular arc,
      computing partial derivatives of the Hamiltonian with respect to the buoy states and the control force, and
      computing the control force at which the partial derivatives vanish; and
   applying the computed control force to the buoy to extract energy from the heave wave motion.

2. The method of claim 1, wherein the buoy states comprise a heave position and a heave velocity of the buoy.

3. The method of claim 2, wherein the buoy states further comprise a radiation state.

4. The method of claim 1, wherein the excitation force is estimated from a wave elevation in front of the buoy.

5. The method of claim 1, wherein the excitation force estimated from one or more pressure measurements on a surface of the buoy and a heave position of the buoy.

6. The method of claim 1, wherein the buoy comprises a cylindrical buoy or a spherical buoy.

7. A wave energy converter for extracting energy from water waves, comprising:
   a buoy in water having heave wave motion,
   a controller for computing a control force, wherein the controller:
      estimates an excitation force of the heave wave motion on the buoy;
      computes a control force from the estimated excitation force using a dynamic model, wherein the model:
         constructs a Hamiltonian as a function of buoy states, wherein the Hamiltonian is a linear function of the control force and wherein the control force comprises a singular arc,
         computes partial derivatives of the Hamiltonian with respect to the buoy states and the control force, and
         computes the control force at which the partial derivatives vanish; and
   an actuator for applying the computed control force to the buoy to extract energy from the heave wave motion.

8. The wave energy controller of claim 7, wherein the buoy states comprise a heave position and a heave velocity of the buoy.

9. The wave energy controller of claim 8, wherein the buoy states further comprise a radiation state.

10. The wave energy controller of claim 7, wherein the excitation force is estimated from a wave elevation in front of the buoy.

11. The wave energy controller of claim 7, wherein the excitation force estimated from one or more pressure measurements on a surface of the buoy and a heave position of the buoy.

12. The wave energy controller of claim 7, wherein the buoy comprises a cylindrical buoy or a spherical buoy.

* * * * *